US012763303B1

(12) United States Patent
Liu et al.

(10) Patent No.: US 12,763,303 B1
(45) Date of Patent: Oct. 13, 2026

(54) MASS SPECTROMETRY SAMPLE PREPARATION APPARATUS AND METHOD

(71) Applicants: CALIBRA SCIENTIFIC. INC, Hangzhou (CN); HANGZHOU CALIBRA TECHNOLOGIES CO., LTD, Hangzhou (CN)

(72) Inventors: Huafen Liu, Hangzhou (CN); Zhibin Ji, Hangzhou (CN); Yabo Wang, Hangzhou (CN)

(73) Assignees: CALIBRA SCIENTIFIC. INC, Hangzhou (CN); HANGZHOU CALIBRA TECHNOLOGIES CO., LTD, Hangzhou (CN)

(*) Notice: Subject to any disclaimer, the term of this patent is extended or adjusted under 35 U.S.C. 154(b) by 0 days.

(21) Appl. No.: 19/632,455

(22) Filed: Mar. 30, 2026

(30) Foreign Application Priority Data

Oct. 29, 2025 (CN) ........................ 202511555417.9

(51) Int. Cl.

| | |
|---|---|
| ***H01J 49/04*** | (2006.01) |
| ***G01N 35/00*** | (2006.01) |
| ***G01N 35/02*** | (2006.01) |
| ***G01N 35/04*** | (2006.01) |
| ***G01N 35/10*** | (2006.01) |

(52) U.S. Cl.
CPC .... *H01J 49/0431* (2013.01); *G01N 35/00732* (2013.01); *G01N 35/0098* (2013.01); *G01N 35/0099* (2013.01); *G01N 35/025* (2013.01); *G01N 35/026* (2013.01); *G01N 35/04* (2013.01); *G01N 35/1002* (2013.01); *G01N 35/1011* (2013.01)

(58) Field of Classification Search
CPC .......... H01J 49/0431; G01N 35/00732; G01N 35/0098; G01N 35/0099; G01N 35/025; G01N 35/026; G01N 35/04; G01N 35/1002; G01N 35/1011
See application file for complete search history.

(56) References Cited

FOREIGN PATENT DOCUMENTS

| | | | | |
|---|---|---|---|---|
| JP | 2023522712 A | * | 5/2023 | ....... G01N 35/00732 |
| TW | 201037309 A | * | 10/2010 | ............. G01N 35/04 |

* cited by examiner

*Primary Examiner* — Andrew Smyth

(57) ABSTRACT

A mass spectrometry sample preparation apparatus includes a sample platform having a loading area; a delivery component, in which the delivery component is configured to receive and convey a sample tube disposed at a priority loading position when the sample tube is disposed at the priority loading position; and a control component. The control component includes a grasping mechanism, an information identification mechanism, a clamping mechanism and a cap removal mechanism. A sample preparation device includes: a conveyor rail component; a pipetting component; a reaction disk component, in which the reaction disk component is configured to perform magnetic bead-based pretreatment on a sample pipetted into a reaction cup; and a sample delivery component, in which the sample delivery component is configured to deliver a sample, having undergone the magnetic bead-based pretreatment, to the mass spectrometer.

14 Claims, 19 Drawing Sheets

MASS SPECTROMETRY SAMPLE PREPARATION APPARATUS AND METHOD

CROSS-REFERENCE TO RELATED APPLICATION

This application claims priority to Chinese patent application No. 202511555417.9, filed on Oct. 29, 2025, the content of which is hereby incorporated by reference in its entirety.

TECHNICAL FIELD

The present disclosure relates to the field of mass spectrometry analysis and detection technology, and in particular, to a mass spectrometry sample preparation apparatus and a mass spectrometry sample preparation method.

BACKGROUND

Mass spectrometry technology has become a core means for trace substance detection due to high sensitivity, high resolution and high-throughput analysis capability of the mass spectrometry technology, and is applied in the fields of life science, drug research and development, environmental monitoring and food safety. However, mass spectrometry analysis requires extremely high purity, concentration and ionization efficiency of the sample. A wide application of mass spectrometry related detection technology is currently limited by complex biological sample matrices. Interfering substances in biological sample matrices, such as proteins, lipids, and salts, will significantly affect sensitivity, specificity and instrument stability of detection, therefore, a sample preparation technology is a key step of mass spectrometry detection. As the key step for connecting the sample and the mass spectrometer, the sample preparation technology directly affects accuracy, reproducibility and analysis efficiency of the final detection result.

Related sample preparation methods mainly include protein precipitation, liquid-liquid extraction and solid-phase extraction.

Protein precipitation is a rapid deproteinization treatment of biological samples such as blood and cell lysates by precipitating proteins in the samples with organic solvents or acids. The protein precipitation has advantages of simple operation and compatibility with high-throughput application scenarios. The disadvantages of the protein precipitation are that only macromolecular proteins can be removed, more small molecular interferent substances remain, and some target substances may be coprecipitated. High-concentration organic solvents are required to perform nitrogen evaporation, such that reaction steps increase.

Liquid-liquid extraction relies on partition coefficients of a target substance two immiscible solvents, and is primarily employed for isolating fat-soluble compounds. The liquid-liquid extraction has advantages of low cost and simple operation, and is suitable for concentration of large-volume samples. However, disadvantages of the liquid-liquid extraction are obvious, for example, solvent consumption is great, environmental pollution is great, extraction efficiency of polar compounds is low, and emulsification problems may be introduced, so as to require centrifugation or demulsification treatment.

Solid-phase extraction is configured to use adsorbents to selectively adsorb target substances, remove impurities by elution, and is primarily employed for enrichment and purification of trace compounds in biological samples and environmental samples. Advantages of the solid-phase extraction include high purification efficacy (>90% matrix removal), adsorbent flexibility, and capability for sample enrichment. Disadvantages of the solid-phase extraction include labor-intensive and time-consuming procedures, batch-to-batch variability of adsorbents that compromises reproducibility, potential interference with mass spectrometry ion sources caused by high-salt or high-organic eluents, low throughput, and inconsistent performance.

Related sample preparation technologies mainly include magnetic bead-based method, immunoaffinity extraction and online solid-phase extraction. The related mass spectrometry sample preparation technology is expected to be free of dependence on manual operations in related methods, and is further expected to be high-throughput and intelligent.

SUMMARY

Based on this, it is necessary to provide a mass spectrometry sample preparation apparatus and mass spectrometry sample preparation method in view of at least one of above problems.

In a first aspect, the present disclosure provides a mass spectrometry sample preparation apparatus for providing a pretreated sample to a mass spectrometer. The mass spectrometry sample preparation apparatus includes a sample platform and a sample preparation device. The sample platform has a loading area including a routine loading position and a priority loading position. The sample platform includes a delivery component and a control component. The delivery component is configured to receive and deliver a sample tube at the routine loading position, and the delivery component is configured to receive and deliver the sample tube at the priority loading position when present. The control component is configured to control the sample tube to be delivered to the sample preparation device. The mass spectrometry sample preparation apparatus further includes a control component configured to control a sample tube to be delivered to the sample preparation device. The control component includes a grasping mechanism, an information identification mechanism, a clamping mechanism and a cap removal mechanism. The grasping mechanism is configured to acquire the sample tube from the delivery component. The information identification mechanism is configured to identify information of the acquired sample tube. The clamping mechanism is configured to clamp a tube body of the acquired sample tube. The cap removal mechanism is configured to remove a cap of the acquired sample tube. The sample preparation device includes a conveyor rail component, a pipetting component, a reaction disk component and a sample delivery component. The conveyor rail component includes a routine inlet rail and a priority inlet rail. Both the routine inlet rail and the priority inlet rail are coupled to the grasping mechanism and are configured to convey the sample tube processed by the control component. The pipetting component is configured to aspirate liquid from and dispense liquid to the conveyor rail component. The reaction disk component is configured to perform magnetic bead-based pretreatment on a sample dispensing into a reaction cup. The sample delivery component is configured to deliver a sample, having undergone the magnetic bead-based pretreatment, to the mass spectrometer.

By providing the routine loading position, the priority loading position, the routine inlet rail and the priority inlet rail, different sample delivery modes are enabled, and the sample tube at the priority loading position can be processed out of turn. Automatic coupling of the sample platform and the sample preparation device is realized by the control component, such that a pulsatile operation of the whole mass spectrometry sample preparation apparatus is effectively managed.

The mass spectrometry sample preparation apparatus provided by an embodiment of the present disclosure can achieve at least one of following effects: a pretreatment is performed by a magnetic bead-based method to subject an extraction. The method is compatible with solid-phase magnetic beads and immunomagnetic beads, demonstrating excellent compatibility. The magnetic bead-based method can complete extraction in a short time, thereby significantly shortening experimental cycle. High-purity products can be acquired by selective adsorption mechanism of the magnetic bead-based method, thereby reducing interference in subsequent experiments. The magnetic bead-based method does not require complex centrifugation or vacuum filtration steps, and the extraction can be completed by simple mixing, magnetic separation and washing operations. The magnetic bead-based method is suitable for various sample types such as blood, tissue, saliva and environmental samples, and can adapt to different experimental requirements. By utilizing advantages of the magnetic bead-based method, the sample preparation method realizes fully automatic treatment, so as to reduce manual errors and improve efficiency. By adopting a production line mode, parallel processing of various steps is realized, and throughput of the pre-treatment is greatly increased. The sample preparation device is compatible with a multi-mode state. A front end of the sample preparation device employs a reaction cup as a processing unit, enabling on-demand testing with as little as a single-sample load, thereby minimizing reagent waste, and meanwhile, an rear end of the sample preparation device supports transfer from individual reaction cups to a 96-well plate, such that the mass spectrometry sample preparation apparatus has extremely high compatibility. The mass spectrometry sample preparation apparatus is configured with a high-capacity sample platform to support online loading and unloading of the sample basket. The delivery component is configured to intelligently retrieve sample racks to realize functions such as priority processing for priority samples, automated insertion of quality-control specimens out of sequence and so on, so as to meet more and more complex use scenario requirements. A maximum sample buffer size is up to 320 people, so as to realize an unattended operation time for 8 hours to 12 hours. In addition, the mass spectrometry sample preparation apparatus is provided with a sample channel configured to be coupled to the production line, and the sample channel can be coupled to fully automatic detection production line.

In some embodiments, the delivery component includes a transport member movable along a first direction. Along a movement of the transport member, one end of the transport member is defined as the priority loading position, and the control component is disposed on the other end of the transport member. The loading area includes a plurality of routine loading positions. The plurality of routine loading positions are disposed on both sides of the transport member. Exemplarily, the mass spectrometry sample preparation apparatus further includes a quality-control loading position. The quality-control loading position and the priority loading position are disposed on both sides of the transport member, respectively. Exemplarily, the sample platform further includes an inlet and outlet interface, the inlet and outlet interface is spaced apart from the grasping mechanism. The inlet and outlet interface and the grasping mechanism are configured to be coupled to each other via the transport member. The inlet and outlet interface is configured to be coupled to a production line.

In some embodiments, the mass spectrometry sample preparation apparatus further includes a sample rack, a sample basket, and a diverter turntable. The sample rack is configured to accommodate a column of sample tubes. The sample basket is configured to be positioned at the routine loading position and to accommodate a row of sample racks. A side of the sample basket towards the transport member is provided with an opening. The transport member is provided with a telescopic part configured to collect and deliver the sample rack along a second direction. The diverter turntable is spaced apart from the control component and is configured to be coupled to the transport member. The diverter turntable is configured to rotate the sample rack for direction change. Exemplarily, the loading area can simultaneously accommodate 320 of sample tubes disposed at the routine loading position.

In some embodiment, control component further includes a pushing mechanism and a lift mechanism. The pushing mechanism is configured to drive the grasping mechanism to move, so as to correspond to the routine inlet rail or the priority inlet rail. The lift mechanism is configured to drive the clamping mechanism, such that the clamping mechanism has a low position or a high position. The cap removal mechanism is configured as the rotatable cap removal mechanism. When the clamping mechanism is at the high position, the cap removal mechanism is configured to clamp a cap of the acquired sample tube. Exemplarily, the information identification mechanism includes a first scanning member and a second scanning member. The first scanning member is configured to scan the acquired sample tube, and the second scanning member is configured to scan a controlled and rotated sample tube clamped by the cap removal mechanism.

In some embodiments, the sample preparation device further includes a loading mechanism. The loading mechanism includes a feeding chamber, a waste chamber, a vertical pushing mechanism, a guide support member, a horizontal pushing mechanism, a centering clamping mechanism and a receiving member. The feeding chamber is disposed in parallel with the waste chamber. The vertical pushing mechanism is disposed in the feeding chamber. The guide support member is disposed above the vertical pushing mechanism and is configured to be pushed upward by the vertical pushing mechanism. The horizontal pushing mechanism is disposed on the guide support member. The centering clamping mechanism is disposed on the waste chamber and configured to clamp a supporting rack which is loaded with a pipette tip. The receiving member is disposed in the waste chamber.

In some embodiments, the pipetting component includes a three-axis motion mechanism and a pipetting mechanism. Supporting legs of the three-axis motion mechanism are disposed on both sides of the conveyor rail component along an extending direction of the conveyor rail component. The pipetting mechanism is fixed at an end of the three-axis motion mechanism. The pipetting mechanism includes a drive member, a pipette, and a tip ejector. The drive member is configured to drive the pipette to aspirate and dispense liquid. The tip ejector is configured to eject a pipette tip installed at the pipette.

In some embodiments, the sample delivery component includes a reaction cup transfer member and a 96-well plate loading position. The sample preparation device further includes a reaction cup feeding component and a cup handling component. The reaction cup feeding component includes a feeder, a vertical feeding mechanism, a horizontal transfer mechanism and a rotary cup dispensing mechanism. The feeder is provided with a restricted selective outlet. The vertical feeding mechanism is configured to push a reaction cup from the feeder towards the restricted selective outlet. The horizontal transfer mechanism is configured to convey the reaction cup from the restricted selective outlet to the rotary cup dispensing mechanism. The feeder is disposed on a side of the reaction disk component away from the conveyor rail component. The horizontal transfer mechanism extends to the conveyor rail component. The cup handling component includes a mechanical arm and a waste liquid aspiration needle. The mechanical arm is configured to convey the reaction cup from the reaction cup feeding component to the reaction disk component, and is configured to remove a waste reaction cup from the reaction cup transfer member. The waste liquid aspiration needle is configured to suck waste liquid from the waste reaction cup. The waste liquid aspiration needle is configured to suck waste liquid from the reaction cup of reaction disk component. The cup handling component is disposed between the reaction disk component and the conveyor rail component. The 96-well plate loading position is disposed on a side of the reaction disk component away from the sample platform. The pipetting component is configured to inject liquid into a 96-well plate at the 96-well plate loading position.

In some embodiments, the sample preparation device further includes a reagent disk component, a reagent needle component and a cleaning tank component. The reagent disk component includes a third scanning member configured for scanning a reagent kit in the reagent disk component. The reagent disk component is disposed between the reaction disk component and the sample platform. The reagent needle component is configured to transfer a reagent from the reagent disk component to the reaction disk component. The reagent needle component includes a lift drive mechanism, a rotary drive mechanism, a spline shaft, a swing arm and a reagent needle. The spline shaft is slidably connected to the rotary drive mechanism and is configured to be driven to rotate. The lift drive mechanism is configured to drive the spline shaft to slide. Both ends of the swing arm are fixed on the spline shaft and the reagent needle, respectively. The reagent needle component is positioned between the reaction disk component and the reagent disk component. The cleaning tank component is configured to clean the reagent needle.

In some embodiments, the reaction disk component includes a first outer disk, a first inner disk, a first mixing member, a first magnetic separation member, and a rinse member. The first outer disk and the first inner disk are configured to limit one corresponding reaction cup and adjust a position of the reaction cup. The first mixing member is configured to mix substances in the reaction cup. The first magnetic separation member is configured to attract the magnetic beads in the reaction cup. The rinse member is configured to rinse the magnetic beads and suction waste liquid.

In some embodiments, the sample preparation device further includes a buffer disk component. The buffer disk component includes a second outer disk, a second inner disk, a dilution member, a second mixing member and a second magnetic separation member. The second outer disk and the second inner disk are configured to limit the corresponding reaction cup and adjust a position of the reaction cup. The dilution member is configured to dilute a substance in the reaction cup. The second mixing member is configured to mix the substance in the reaction cup. The second magnetic separation member is configured to attract magnetic beads in the reaction cup. Exemplarily, the pipetting component is further configured to transfer samples to the buffer disk component from the reaction disk component. The number of the reaction cup accommodated by the buffer disk component is greater than or equal to that of the reaction cup accommodated by the reaction disk component.

Exemplarily, the cup handling component of the sample preparation device is configured to deliver the reaction cup containing the sample from the buffer disk component to the reaction cup transfer member of the sample delivery component.

In a second aspect, the present disclosure provides a mass spectrometry sample preparation method based on the aforementioned mass spectrometry sample preparation apparatus. The mass spectrometry sample preparation method includes: delivering the sample tube to the control component, including: delivering the sample tube disposed at the routine loading position to the control component; and in response to the priority loading position being placed with the sample tube, receiving the sample tube disposed at the priority loading position, in which the sample tube disposed at the priority loading position is inserted ahead of the sample tube to be delivered at the routine loading position, and delivering the sample tube at the priority loading position to the control component; and controlling the sample tube to be delivered to the sample preparation device, including: identifying information of the acquired sample tube by the control component, clamping a tube body of the acquired sample tube by a clamping mechanism of the control component, and removing the cap of the acquired sample tube by the cap removal mechanism of the control component; delivering the sample tube which is controlled, including: delivering the sample tube which is controlled from the routine loading position by the routine inlet rail; delivering the sample tube which is controlled from the priority loading position by the priority inlet rail; taking and pipetting liquid from the conveyor rail component; performing magnetic bead-based pretreatment on a sample pipetted into the reaction cup; and delivering a sample which is performed the magnetic bead-based pretreatment to the mass spectrometry sample preparation apparatus.

In the present disclosure, the mass spectrometry sample preparation method uses a mass spectrometry sample preparation method, so as to achieve at least one effect such as automation, high throughput, and strong compatibility, and is conducive to improving an overall performance of mass spectrometry analysis.

In some embodiments, the magnetic bead-based pretreatment includes using immunomagnetic beads or solid-phase magnetic beads.

In some embodiments, the mass spectrometry sample preparation method further includes: transferring the sample to the buffer disk component of the sample preparation device from the reaction disk component; and using the cup handling component of the sample delivery component to convey the reaction cup containing the sample from the buffer disk component to the reaction cup transfer member of the sample delivery component. Exemplarily, dispensing liquid is performed from the buffer disk component to the 96-well plate at the 96-well plate loading position of the sample delivery component.

Exemplarily, the step of delivering the sample tube to the control component further includes: in response to the sample tube being disposed at the quality-control loading position of the sample platform, inserting the sample tube disposed at the quality-control loading position of the sample platform before the sample tube to be delivered at the routine loading position, and conveying the sample tube to the control component; delivering the sample tube received from the production line at the inlet and outlet interface of the sample platform to the control component; and converting the sample tube which is disposed in reverse and inserted ahead of the control component into a forward arrangement by the diverter turntable of the sample platform. The step of controlling the sample tube to be delivered to the sample preparation device further includes: performing horizontal scanning on the acquired sample tube by a first scanning member of the control component; clamping the sample tube and controlling the sample tube to rotate for one circle by the cap removal mechanism of the control component, and performing scanning on the sample tube controlled to rotate by a second scanning member of the control component. The reaction cup feeding component of the sample preparation device is configured to supply at least 1000 reaction cups. The reagent disk component of the sample preparation device is configured to supply at least 3000 doses of reagents, such that an unattended operation time of the mass spectrometry sample preparation method is greater than or equal to 8 hours.

Figure 1:
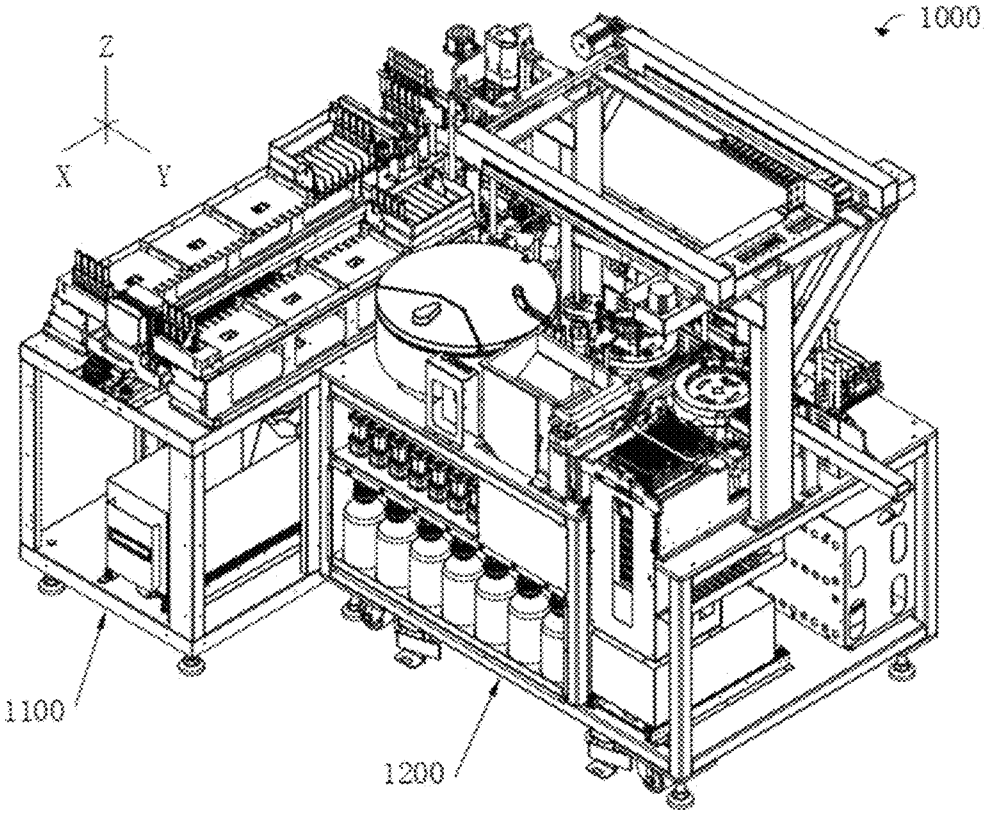
FIG. 1 is a schematic axonometric view of a mass spectrometry sample preparation apparatus in some embodiments.

Reference signs are as follows: 1 represents a routine loading position; 2 represents a priority loading position; 3 represents a transport member; 4 represents a grasping mechanism; 5 represents an information identification mechanism; 6 represents a clamping mechanism; 7 represents a cap removal mechanism; 8 represents a routine inlet rail; 9 represents a priority inlet rail; 10 represents a quality-control loading position; 11 represents an inlet and outlet interface; 12 represents a diverter turntable; 13 represents a first waste box; 14 represents a pushing mechanism; 15 represents a lift mechanism; 16 represents a return rail; 17 represents a rail-switching mechanism; 18 represents a three-axis motion mechanism; 19 represents a pipetting mechanism; 20 represents a feeder; 201 represents a selective outlet; 21 represents a vertical feeding mechanism; 22 represents a horizontal transfer mechanism; 23 represents a rotary cup dispensing mechanism; 24 represents a mechanical arm; 25 represents a waste liquid aspiration needle; 26 represents a lift drive mechanism; 27 represents a rotary drive mechanism; 28 represents a spline shaft; 29 represents a swing arm; 30 represents a reagent needle; 31 represents a first outer disk; 32 represents a first inner disk; 33 represents a first mixing member; 34 represents a first magnetic separation member; 35 represents a rinse member; 36 represents a second outer disk; 37 represents a second inner disk; 38 represents a dilution member; 39 represents a second mixing member; 40 represents a second magnetic separation member; 41 represents a reaction cup transfer member; 42 represents a 96-well plate loading position; 43 represents a second waste box; 44 represents a cooling circulation assembly; 45 represents a third outer disk; 46 represents a third inner disk; 47 represents a third mixing member; 48 represents a cooling mechanism; 49 represents a thermal insulation layer; 50 represents a horizontal-shift drive mechanism; 51 represents a vertical-handling drive mechanism; 101 represents a first scanning member; 102 represents a second scanning member; 103 represents a feeding chamber; 104 represents a waste chamber; 105 represents a vertical pushing mechanism; 106 represents a guide support member; 107 represents a horizontal pushing mechanism; 108 represents a centering clamping mechanism; 109 represents a receiving member; 110 represents a supporting leg; 111 represents a drive member; 112 represents a pipette; 113 represents a tip ejector; 114 represents a third scanning member; 115 represents a first sensor; 116 represents a waste-cap transfer mechanism; 117 represents a waste-cap hopper; 118 represents a waste liquid pump; 119 represents a solvent bottle; 120 represents a fluid line pump-valve component; 121 represents a fluid line conversion component; 122 represents a button indicator component; 123 represents a rail mounting frame; 124 represents a second sensor; 125 represents a third sensor; 126 represents a belt-driving mechanism; 127 represents a temporary retention component; 128 represents a routine-sample positioning component; 129 represents a priority-sample positioning component; 130 represents a rail-switching drive mechanism; 131 represents a rail switching lever; 132 represents a Y-axis transmission mechanism; 133 represents a Y-axis drive mechanism; 134 represents a X-axis transmission mechanism; 135 represents a X-axis drive mechanism; 136 represents a Z-axis lift mechanism; 137 represents an oblique support; 138 represents a pipetting control board; 139 represents a detection control board; 140 represents a pipetting mounting base; 141 represents a first-stage reduction gear mechanism; 142 represents a second-stage reduction gear mechanism; 143 represents a third-stage reduction gear mechanism; 144 represents a fourth sensor; 145 represents a fifth sensor; 146 represents a horizontal-pushing drive mechanism; 147 represents a clamping drive mechanism; 148 represents a three-section push rail; 149 represents a magnet component; 150 represents a cable drag chain; 151 represents a rinse liquid needle; 152 represents a rinse and lift mechanism; 153 represents a rinse water needle; 154 represents a sixth sensor; 155 represents a wire transition plate; 156 represents a vertical-feed mechanism mounting base; 157 represents a crank-slider mechanism; 158 represents a vertical-feed drive member; 159 represents a first-stage feed pusher; 160 represents a second-stage feed pusher; 161 represents a third-stage feed pusher; 162 represents a seventh sensor; 163 represents a retention-position adjustment mechanism; 164 represents a flat-belt conveyor member; 165 represents a horizontal conveyor drive member; 166 represents a first cup-pressing mechanism; 167 represents a first inner-disk drive mechanism; 168 represents a second cup-pressing mechanism; 169 represents a second inner-disk drive mechanism; 170 represents a ninth sensor; 171 represents a third inner-disk drive mechanism; 172 represents a tooth-shaped mixing plate; 173 represents a fixing cover; 174 represents a window cover; 175 represents a liquid-detection control board; 176 represents a tenth sensor; 177 represents a waste-liquid extraction vertical drive mechanism; 178 represents a cup-discarding link; 179 represents an inlet interface; 180 represents an outlet interface; 1000 represents a mass spectrometry sample preparation apparatus; 1100 represents a sample platform; 1101 represents a loading area; 1102 represents a delivery component; 1103 represents a control component; 1104 represents a sample basket; 1105 represents a sample platform frame; 1106 represents a first control element; 1200 represents a sample preparation device; 1201 represents a conveyor rail component; 1202 represents a pipetting component; 1203 represents a reaction disk component; 1204 represents a sample delivery component; 1205 represents a loading mechanism; 1206 represents a reaction cup feeding component; 1207 represents a cup handling component; 1208 represents a reagent disk component; 1209 represents a reagent needle component; 1210 represents a cleaning tank component; 1211 represents a buffer disk component; 1212 represents a sample preparation frame; 1213 represents a second control element; 2000 represents a mass spectrometer; 3000 represents a production line; 4000 represents a sample rack; 5000 represents a sample tube; and 6000 represents a reaction cup.

DETAILED DESCRIPTION

In order to make above objectives, features, and advantages of the present disclosure more obvious and understandable, a detailed explanation of the specific implementation of the present disclosure will be provided below in combination with drawings. Many specific details are elaborated in following description to facilitate a thorough understanding of the present disclosure. A specific implementation described here is only for the purpose of explaining the present disclosure and does not limit a scope of protection of the present disclosure.

In the description of the present disclosure, it should be understood that the terms “center”, “longitudinal”, “transversely”, “length”, “width”, “thickness”, “up”, “down”, “left”, “right”, “vertical”, “horizontal”, “top”, “bottom”, “inside”, “outside”, “clockwise”, “counterclockwise”, “axial”, “radial”, “circumferential” and so on denoting an orientation or a position relationship are based on the orientation or the position relationship shown in the attached drawings, it is just for convenience and simple to describe the present disclosure, but not indicating or implying an apparatus and a device having a specific orientation, constructing and operating in a specific orientation, therefore cannot be understood as limiting the present disclosure.

In the present disclosure, unless there is the otherwise specifications and limitations, the first feature is “above” or “below” the second feature which may be a direct contact between the first and second features, or the first features and the second features may be in indirect contact through an intermediate medium. Moreover, the first feature is “on”, “above”, and “over” the second feature can be that the first feature is directly or diagonally above the second feature, or only indicates that the first feature is horizontally higher than the second feature. The first feature is “beneath”, “below”, and “under” the second feature can be that the first feature is directly or diagonally below the second feature, or only indicate that the horizontal height of the first feature is less than that of the second feature In addition, the terms “first” and “second” are only used to describe the purpose and can not be understood as indicating or implying relative importance or implying the quantity of indicated technical features. Therefore, the features limited to “first” and “second” can explicitly or implicitly include at least one of these features. In the description of the present application, “multiple” means at least two, such as two, three, etc., unless there is an otherwise specific limitation. Exemplarily, the first outer disk may be referred to as a second outer disk, and the second outer disk may be referred to as a first outer disk. In the description of the present disclosure, “a plurality of” means at least two, such as two, three and so on, unless otherwise specifically defined.

In the present disclosure, unless otherwise specified and limited, the terms “installation” and “connection” and so on should be broadly understood. For example, it may be a fixed connection, a detachable connection, or integrated; it may be a mechanical connection or an electrical connection; and it may be directly connected or indirectly connected through an intermediate medium, and may be a connection within two components or an interaction relationship between two components, unless otherwise specified. The terms “installation,” “disposed,” “fixed,” and so on may be broadly understood as a connection. For ordinary skilled in the field, the specific meanings of the above terms in the present disclosure may be understood as required.

At present, conventional mass spectrometry sample preparation technologies mainly include solid-phase extraction, liquid-liquid extraction, protein precipitation and ultrafiltration, and so on. The sample preparation methods have their own advantages, but also have their own obvious limitations. The above related mass spectrometry sample preparation technologies generally involve sample enrichment, separation, derivatization, and pre-ionization steps, and suffer from the following technical limitations: high operational complexity, relying on manual intervention, introducing human error, and precluding high-throughput analysis; low temporal efficiency, as solid-phase extraction and liquid-liquid extraction are time-consuming and unsuitable for rapid detection; limited sensitivity, in which matrix interferences in complex samples readily suppress target analyte signals; and insufficient compatibility, with certain sample preparation methods being incompatible with emerging mass spectrometry technologies.

Related mass spectrometry sample preparation technologies mainly include magnetic bead-based method, immunoaffinity extraction and online solid phase extraction. The mass spectrometry sample preparation technologies evolve from related methods relying on manual operations to automation, high-throughput and intelligent. Moreover, the mass spectrometry sample preparation technologies are expected that a development of mass spectrometry sample preparation technologies can improve detection efficiency and accuracy, provide a basis for precision medicine and point-of-care testing (POCT). With a rapid development and breakthrough of the mass spectrometry sample preparation technologies, the mass spectrometry technologies will play a wider role in clinical inspection.

Figure 2:
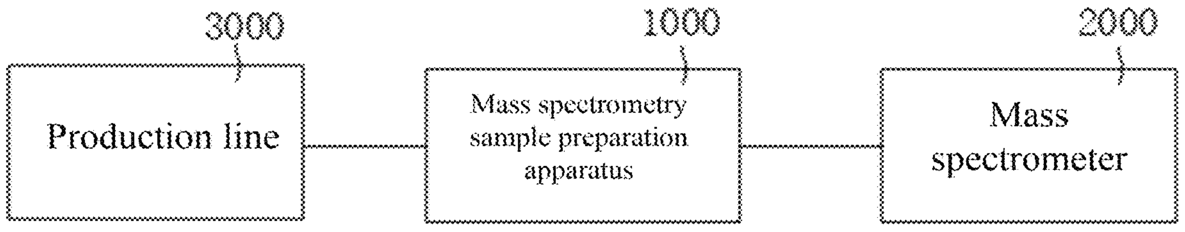
FIG. 2 is a schematic block diagram of a mass spectrometry system in some embodiments.

FIG. 1 is a mass spectrometry sample preparation apparatus in some embodiments of the present disclosure. FIG. 2 is a mass spectrometry system in some embodiments of the present disclosure, and the mass spectrometry sample preparation apparatus 1000 may be configured to provide a pretreated sample to the mass spectrometry device 2000. In an exemplary embodiment, the mass spectrometry sample preparation apparatus 1000 includes a sample platform 1100 and a sample preparation device 1200.

The sample rack 4000 and the sample tube 5000 may be configured as external elements delivered by the mass spectrometry sample preparation apparatus 1000, and the sample tube 5000 is configured to contain a substance to be analyzed. The mass spectrometry sample preparation apparatus 1000 may further include a sample rack 4000. The sample rack 4000 can accommodate, for example, a column of sample tubes 5000. The sample tube 5000 is restricted by the sample platform 1100 and the sample preparation device 1200 via the sample rack 4000.

For convenience of description, a spatial rectangular coordinate system XYZ is established. An X-axis direction may be referred to as a first direction. A Y-axis direction may be referred to as a second direction. A Z-axis direction may be referred to as a third direction. The sample platform 1100 and the sample preparation device 1200 may be disposed along the Y-axis direction.

Figure 3:
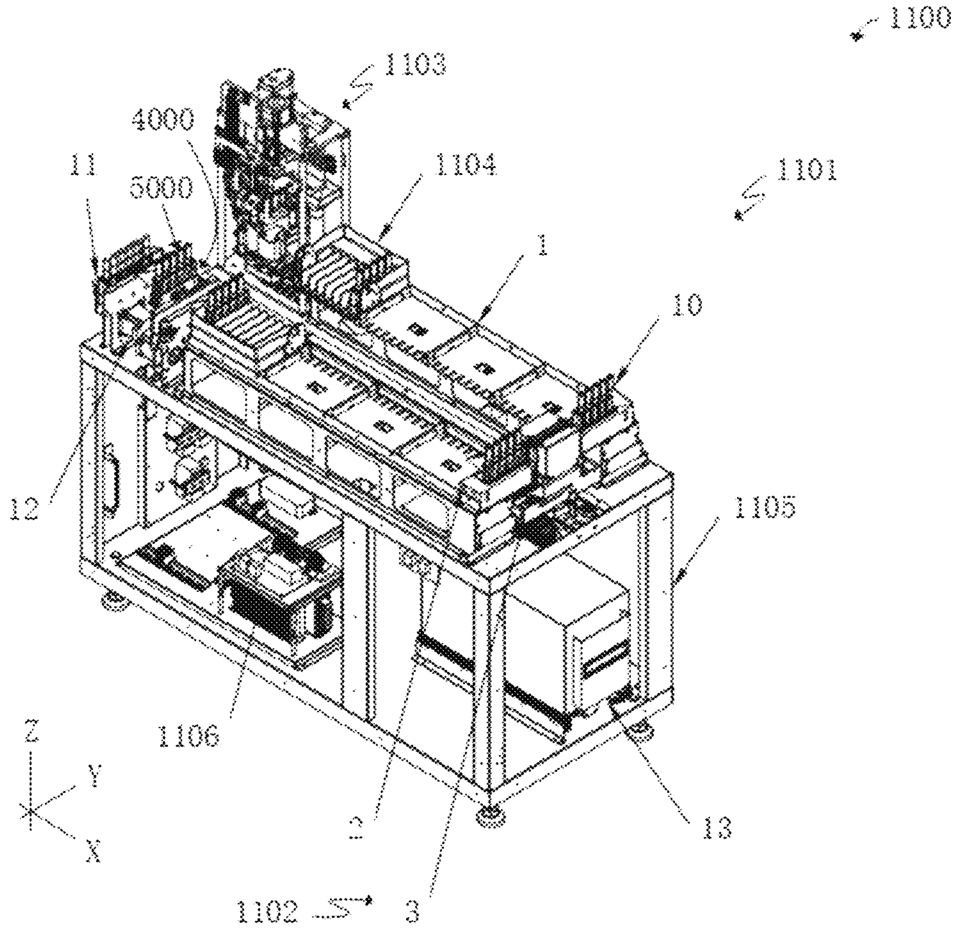
FIG. 3 is a schematic diagram of a sample platform of a mass spectrometry sample preparation apparatus in some embodiments.

Referring to FIG. 3, the sample platform 1100 may include a loading area 1101 and a delivery component 1102. The loading area 1101 is configured to position the sample tube 5000, and may be provided with a plurality of sensors that can identify whether the sample tube 5000 is positioned in the loading area. The delivery component 1102 is configured to receive the sample tube 5000 of the loading area 1101 or configured to receive a sample rack 4000.

The sample platform 1100 may further include a sample platform frame 1105 and a first control element 1106. The loading area 1101 and the delivery component 1102 may be disposed on the sample platform frame 1105, respectively. The first control element 1106 may be disposed within the sample platform frame 1105. The first control element 1106 may include a switching power supply, a control PLC, and various electrical elements, and is electrically connected to the loading area 1101 and the delivery component 1102, so as to realize automatic control and logical implementation of the sample platform 1100. A control unit of the mass spectrometry sample preparation apparatus 1000 may be set centrally or distributed.

The loading area 1101 includes a routine loading position 1 and a priority loading position 2. The routine loading position 1 and the priority loading position may be provided with sensors, respectively. The delivery component 1102 is configured to receive and convey the sample tube 5000 disposed at the routine loading position 1. When the sample tube 5000 is disposed at the priority loading position 2, the delivery component 1102 is inserted ahead of the routine loading position 1 and first receives and conveys the sample tube 5000 disposed at the priority loading position 2.

The mass spectrometry sample preparation apparatus 1000 may further include a sample basket 1104. The sample basket 1104 is configured to be disposed at the routine loading position 1. The sample basket 1104 can accommodate, for example, a row of sample racks 4000 disposed in the X-axis direction. The sample rack 4000 may include a column of sample tubes 5000 disposed in the Y-axis direction. The sample basket 1104 may include a basket body and a pivotable handle. The handle is configured to be rotatable to a stowed position, thereby facilitating access. The basket body may be provided with eight sample rack limiting grooves. The sample rack 4000 can accommodate five sample tubes 5000, so as to transfer 40 sample tubes 5000 in a batch. The priority loading position 2 may place only one sample rack 4000. The loading area 1101 can simultaneously accommodate 320 sample tubes 5000 disposed at the routine loading position 1.

In one embodiment, the delivery component 1102 may include a rail and a transport member 3 disposed in the X-axis direction. The transport member 3 is movable in the X-axis direction. The transport member 3 may include a clamping groove and a telescopic part along the Y-axis direction. The telescopic part can hook the sample rack 4000 from a bottom of the telescopic part, for example, the telescopic portion includes a telescopic rod and a lifting hook disposed on the telescopic rod and capable of lifting along the Z-axis direction, so as to push and pull the sample rack 4000 along the Y-axis direction. The sample rack 4000 in the sample basket 1104 or in the priority loading position 2 can be moved into the clamping groove or moved reversely. In order to facilitate the sample rack 4000 sliding, one side of the sample basket 1104 towards the transport member 3 is provided with an opening. Exemplarily, the transport member 3 may include two clamping grooves and two telescopic parts. For example, the two sample racks 4000 may be pushed and pulled synchronously or alternately.

The loading area 1101 may be provided with a plurality of sensors and a plurality of indicator lights for the different arrangement positions, so as to effectively monitor presence or absence of the sample basket 1104 at a current position, and display a current state of the current sample basket 1104, for example, whether sample extraction is performed can be monitor and display.

Along a movement of the transport member 3, a plurality of routine loading positions 1 are disposed on a side of the transport member 3. The plurality of routine loading position 1 may be disposed on both sides of the rail, for example, four routine loading positions 1 can be disposed on each of both sides of the rail. Sample tubes 5000 are generally labeled in a uniform manner. Therefore, labels of the sample tubes 5000 received by the transport member 3 from different sides were opposite to each other. The transport member 1102 of the sample platform 1100 may further include a diverter turntable 12. The diverter turntable 12 can be connected to the transport member 3 for rotating and reversing the sample rack 4000, facilitating label positions of the sample tubes 5000 delivered by the transport member 3 being basically the same.

Figure 4:
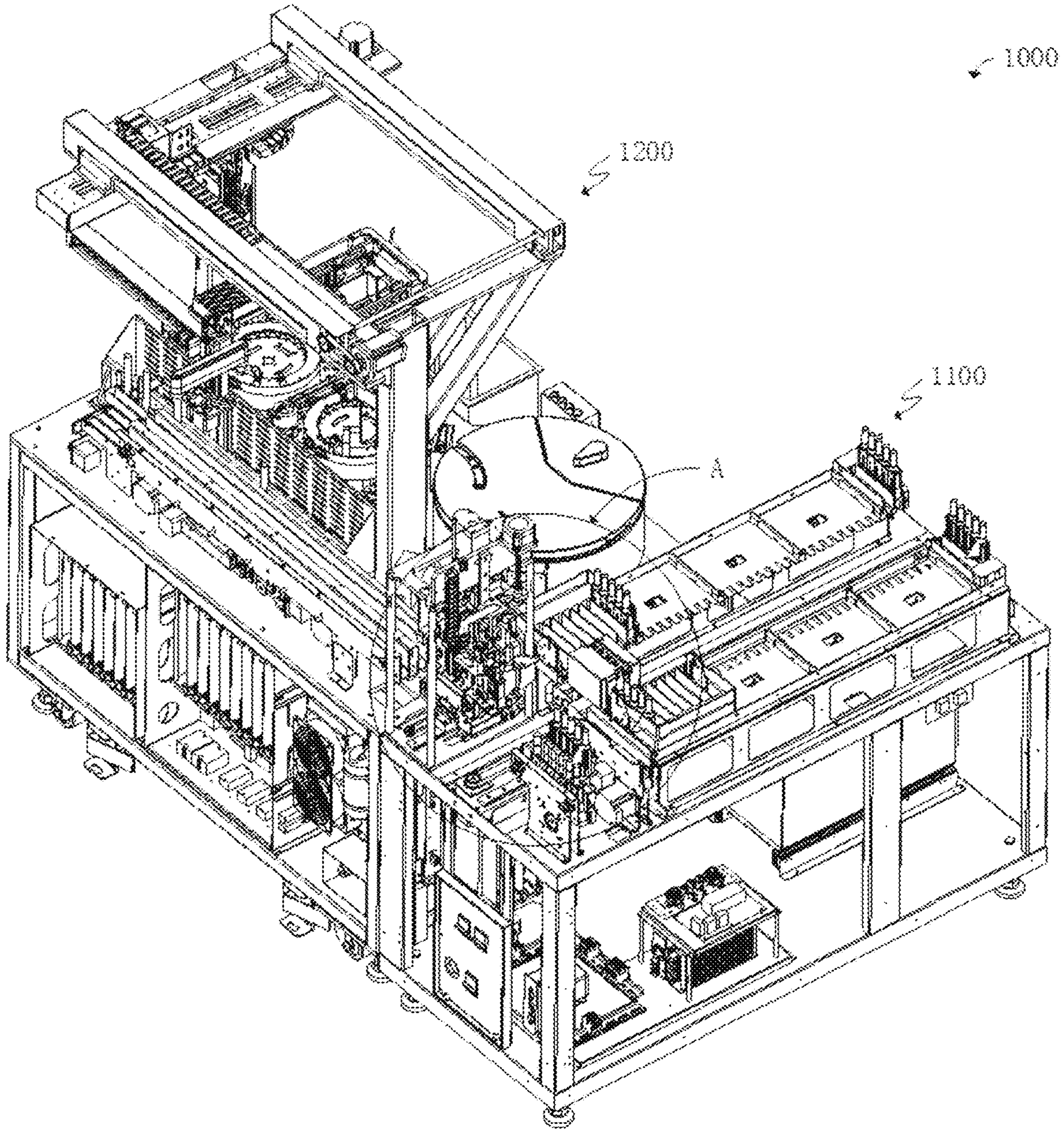
FIG. 4 is a schematic diagram of a mass spectrometry sample preparation apparatus in some embodiments.
Figure 5:
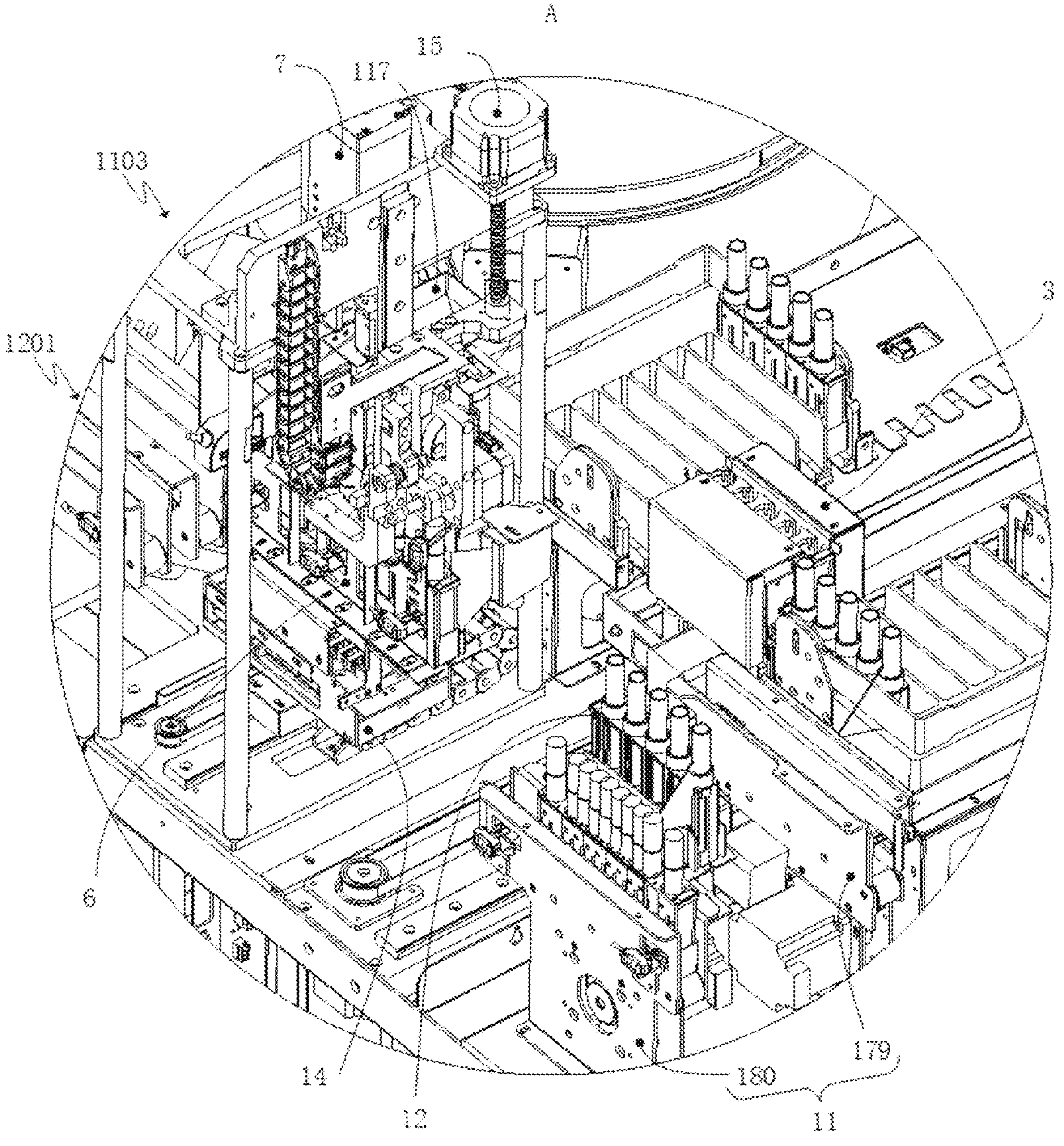
FIG. 5 is an enlarged view of portion A in FIG. 4.
Figure 6:
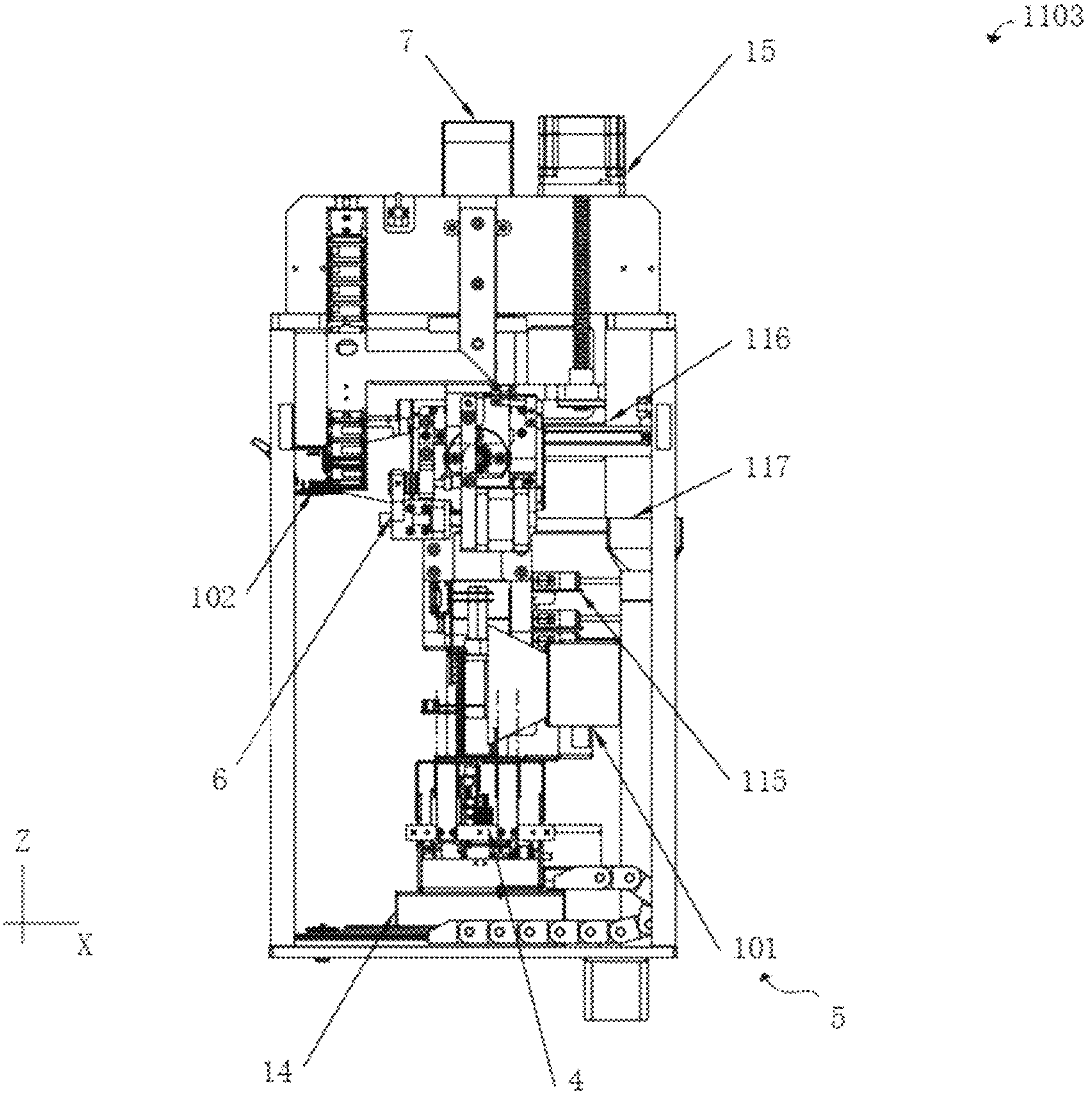
FIG. 6 is a schematic diagram of a control component of a mass spectrometry sample preparation apparatus in some embodiments.

Referring to FIG. 4, FIG. 5 and FIG. 6, the sample platform 1100 may include a control component 1103. The control component 1103 is configured to control the sample tubes 5000 to be delivered to the sample preparation device 1200. The control component 1103 includes a grasping mechanism 4. The grasping mechanism 4 is configured to acquire the sample tube 5000 from the transport member 3 of the delivery component 1102 and can be configured to deliver a sample tube 5000 which is acquired.

The transport member 3 has a travel path in the X-axis direction, a priority loading position 2 is disposed at a first end of the transport member 3, and a control component 1103 is disposed at a second end of the transport member 3. The diverter turntable 12 may be disposed on the second end of the transport member 3 and may be spaced apart from the control component 1103. Exemplarily, the loading area 1101 of the mass spectrometry sample preparation apparatus 1000 further includes a quality-control loading position 10. The quality-control loading position 10 and the priority loading position 2 are disposed on two sides of the transport member 3. The sample platform 1100 may further include an inlet and outlet interface 11. The inlet and outlet interface 11 and the grasping mechanism 4 are spaced apart from each other. The inlet and outlet interface 11 and the grasping mechanism 4 can be coupled to each other via the transport member 3. In addition, the delivery component 1102 may include the inlet and outlet interface 11. A layout of the sample platform 1100 is compact, an automatic action position is concentrated near the control component 1103, and the manual operation position extends farther, such that an influence of manual operation on the automatic action is avoided, and an operator is far away from the action mechanism. The sample platform 1100 has a compact footprint and is configured to interface with an external module.

Referring to FIG. 3, the inlet and outlet interface 11 is configured to be coupled to a production line 3000. The mass spectrometry sample preparation apparatus 1000 is coupled to a fully automatic detection production line, for example, the mass spectrometry sample preparation apparatus 1000 can be coupled to the production line 3000. Exemplarily, the sample rack 4000 sent by the production line 3000 may be delivered to the control component 1103. In case of downstream congestion, the sample rack 4000 may be delivered to the routine loading position 1. The delivery component 1102 may prioritize delivering of sample tubes 5000 to the control component 1103 in the following order: the priority loading position 2 (highest priority), the quality-control loading position 10, the routine loading position 1, and the inlet and outlet interface 11 (lowest priority). Alternatively, priorities may be dynamically adjusted based on operational requirements, such as periodic quality control scheduling. The priority loading position 2 is provided with a sensor to identify presence or absence of the sample tube 5000 disposed at the priority loading position 2, so as to realize functions such as priority processing for priority samples, immediate-on-arrival detecting and so on. The quality-control (QC) loading position 10 can be provided with a sensor to identify presence or absence of the sample tube 5000, so as to realize a function of intelligent QC sample insertion as required in a test in cooperation with the quality control registration of software, thereby greatly ensuring the reliability and stability of the mass spectrometry sample preparation apparatus 1000 and detection results thereof.

Referring to FIG. 5, the inlet and outlet interface 11 may include an inlet interface 179 and an outlet interface 180. The inlet interface 179 can receive the sample tube 5000 delivered by the production line 3000 or the sample tube 5000 carried by the sample rack 4000, and the output interface 180 can return the sample tube 5000 sampled by the mass spectrometry sample preparation apparatus 1000 to the production line 3000, facilitating realizing full-automatic production line processing. Along the X-axis direction, the outlet interface 180 is disposed on a side of the inlet interface 179 away from the loading area 1101. The diverter turntable 12 may be located between the inlet interface 179 and the outlet interface 180. Structure and layout of the diverter turntable 12 and the inlet and outlet interface 11 are compact. The outlet interface 180 has a relatively loose adjustment and connecting space. The transport member 3 has a short transposition path and a short action time.

Referring to FIG. 4, FIG. 5 and FIG. 6, the control component 1103 may further include an information identification mechanism 5, a clamping mechanism 6, and a cap removal mechanism 7. The information identification mechanism 5 is configured to identify information of the sample tube 5000 acquired by the grasping mechanism 4. The clamping mechanism 6 is configured to clamp a tube body of the acquired sample tube 5000. The cap removal mechanism 7 is configured to remove the cap of the acquired sample tube 5000.

The information identification mechanism 5 may include a first scanning member 101. The first scanning member 101 may perform horizontal scanning on the acquired sample tube 5000 substantially along the Y-axis direction, for example, the first scanning member 101 may identify calibration of sample rack numbers and bar codes such as identification and quality control.

The control component 1103 may further include a lift mechanism 15. The lift mechanism 15 can drive the clamping mechanism 6 to lift or lower along the Z-axis direction, such that the clamping mechanism 6 can have a low position and a high position. When the clamping mechanism 6 is at a high position with the acquired sample tube 5000, the cap removal mechanism 7 can clamp the cap of the acquired sample tube. When the clamping mechanism 6 is lowered, the cap removal mechanism 7 can pull the cap out of the tube body.

The cap removal mechanism 7 may include a first sensor 115, a waste-cap transfer mechanism 116 and a waste-cap hopper 117. The number of first sensors 115 may be multiple. For example, a plurality of first sensors 115 detects whether a sample tube 5000 is disposed in the corresponding hole of the sample rack 4000, whether the sample tube 5000 includes the cap, whether the sample tube 5000 is a long tube or a short tube, and so on. After the cap is removed by the cap removal mechanism 7, the clamping mechanism 6 drives the tube body to return to the sample rack 4000. The cap removal mechanism 7 can deliver the cap to the waste-cap transfer mechanism 116. The waste-cap transfer mechanism 116 can deliver the waste cap to the waste-cap hopper 117.

The sample platform 1100 may include a first waste box 13 disposed within a sample platform frame 1105. The waste-cap hopper 117 may be connected to and in communication with the first waste box 13. The first waste box 13 is configured to collect the waste cap. The first waste box is provided with three sections, and can be pulled out of the sample platform frame 1105 for processing, which is simple and convenient.

The cap removal mechanism 7 may be a rotary decapping mechanism configured to unscrew the cap by rotation. The cap removal mechanism 7 may include a rotary gripper capable of clamping the cap tightly. Exemplarily, the information identification mechanism 5 may further include a second scanning member 102. When the cap removal mechanism 7 is in operation, the cap removal mechanism 7 can configured to hold the cap tightly while the clamping mechanism 6 releases the tube body, and meanwhile, the sample tube 5000 can be controlled by the cap removal mechanism 7 to rotate. The second scanning member 102 is configured to perform scanning on the sample tube 5000 that is clamped by the cap removal mechanism 7 and controlled to rotate, such that the sample tube 5000 can be rotated 360° to perform scanning. After scanning, the tube body is clamped by the clamping mechanism 6 and then is removed the cap.

The control component 1103 may further include a pushing mechanism 14. The pushing mechanism 14 can drive the grasping mechanism 4 to move along the X-axis direction to correspond to different rails in the conveyor rail component 1201 of the sample preparation device 1200, and then convey the controlled sample tube 5000. In other embodiments, the sample preparation device 1200 can be connected to the grasping mechanism 4.

The sample platform 1100 can implement at least some of functions such as sample caching, sample tube 5000 decapping, intelligent identification, sample transmission, coupling production line, priority insertion, intelligent quality control insertion and so on.

Figure 7:
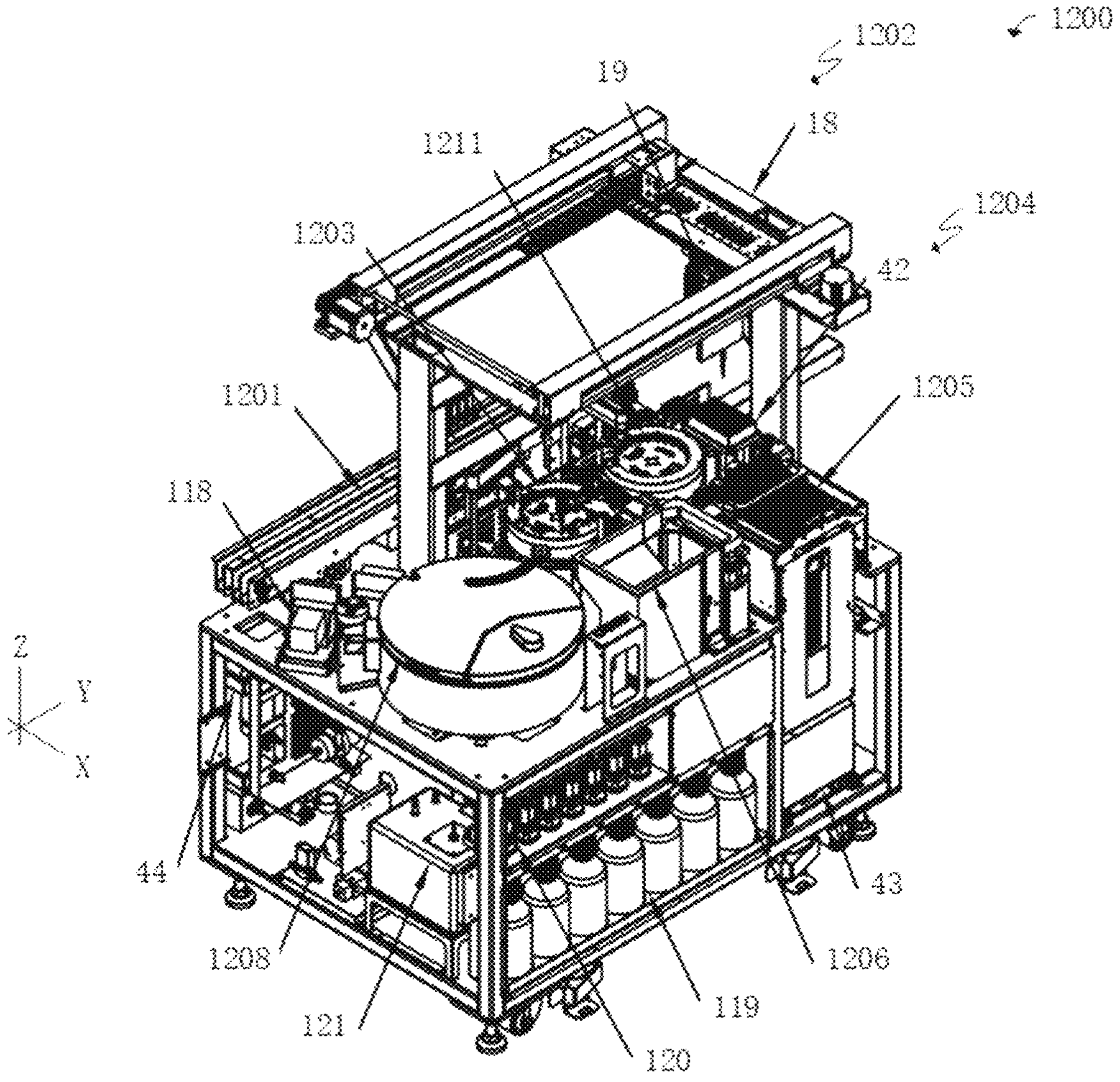
FIG. 7 is a schematic diagram of a sample preparation device of a mass spectrometry sample preparation apparatus in some embodiments.
Figure 8:
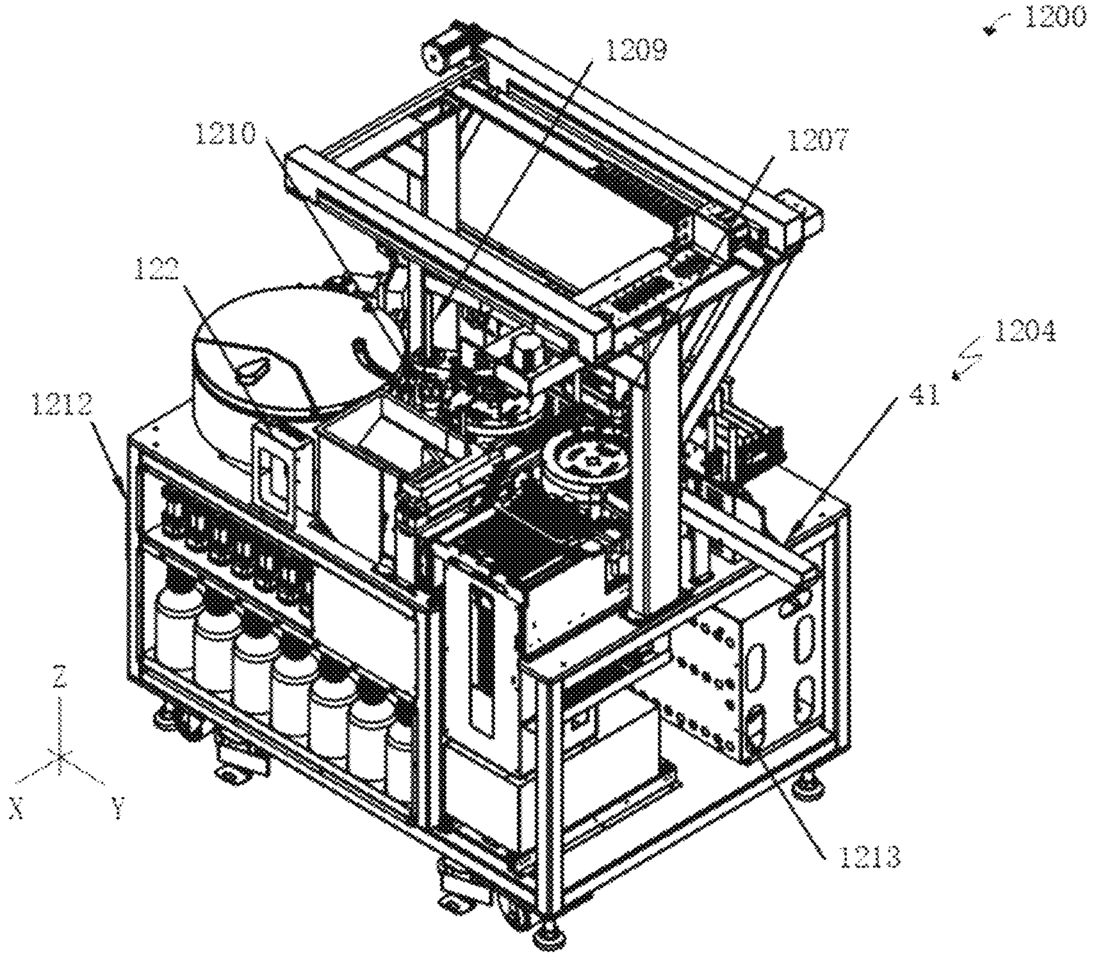
FIG. 8 is a schematic axonometric view of a sample preparation device of a mass spectrometry sample preparation apparatus in some embodiments.

Referring to FIGS. 7 and 8, exemplarily, the sample preparation device 1200 may include a conveyor rail component 1201, a pipetting component 1202, a reaction disk component 1203, and a sample delivery component 1204. Referring to FIG. 8, the sample preparation device 1200 may further include a sample preparation frame 1212 and a second control element 1213. The sample preparation frame 1212 may include a bottom frame and a mounting panel, which are mainly configured for mounting and positioning other components, including integrated mounting of a liquid path portion and an electrical portion. The second control element 1213 may be an electrical element, which is mainly integrated with a hardware control device, such as a switching power supply, an air switch, and a control PCB for controlling actions of other components.

Figure 9:
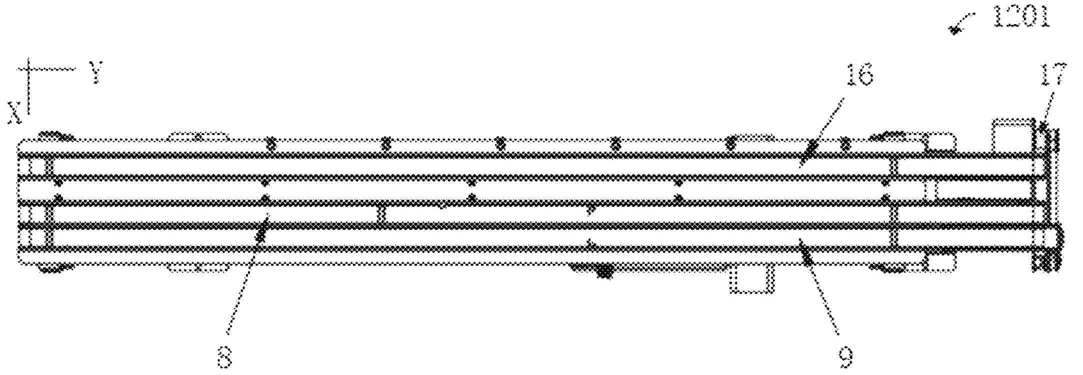
FIG. 9 is a schematic top view of a conveyor rail component of a mass spectrometry sample preparation apparatus in some embodiments.
Figure 10:
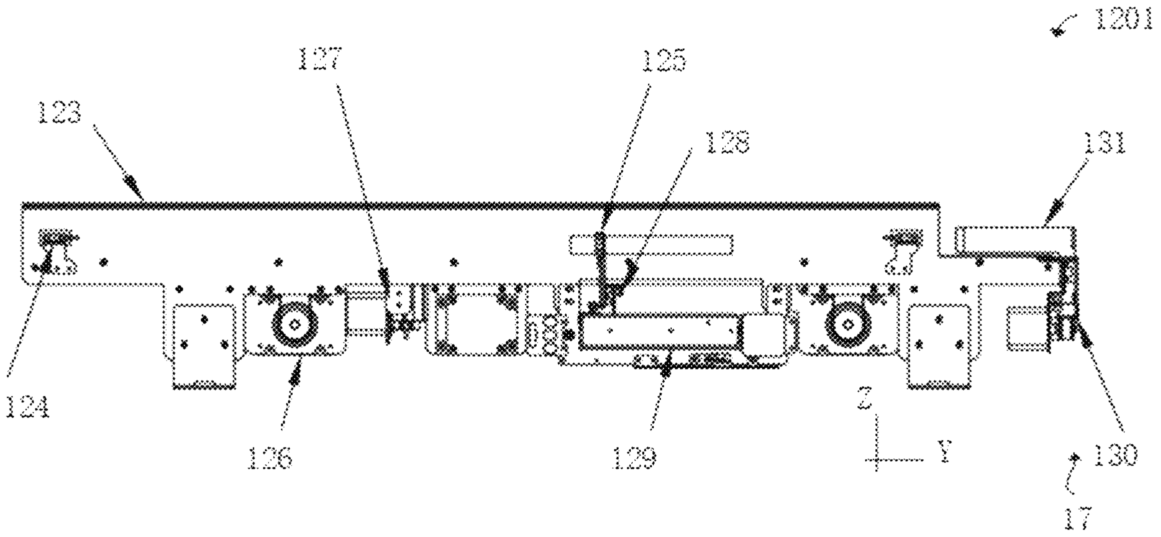
FIG. 10 is a schematic diagram of a conveyor rail component of a mass spectrometry sample preparation apparatus in some embodiments.

Referring to FIGS. 9 and 10, a rail-delivery component 1201 includes a routine inlet rail 8 and a priority inlet rail 9. Both the routine inlet rail 8 and the priority inlet rail 9 are coupled to the grasping mechanism 4 and configured to convey a sample tube 5000 which is controlled. The pipetting component 1202 is configured to aspirate liquid from the conveyor rail component 1201. Furthermore, the pipetting component 1202 is aspirated liquid from the sample tube 5000. The pipetting component 1202 is configured to aspirate liquid.

The conveyor rail component 1201 may further include a return rail 16 and a rail-switching mechanism 17. The return rail 16 can be coupled to the grasping mechanism 4. The routine inlet rail 8, the priority inlet rail 9 and the return rail 16 may be disposed in parallel. Referring to FIG. 7, the priority inlet rail 9 may be a rail, which is most adjacent to the pipetting component 1202, along the X-axis direction. The return rail 16 may be a rail which is most away from the pipetting component 1202. An end of the grasping mechanism 4 disposed on the conveyor rail component 1201 is defined as a head end, and the rail-switching mechanism 17 may be defined as a tail end. The rail-switching mechanism 17 is configured to switch the sample tube 5000 disposed at the routine inlet rail 8 or the priority inlet rail 9 to the return rail 16. Referring to FIG. 10, the rail-switching mechanism 17 may include a rail switching lever 131 movable along the X-axis direction and a rail-switching drive mechanism 130 configured to control the rail switching lever 131. The rail switching lever 131 may be connected to various rails, so as to grasp the sample rack 4000 and drive the sample rack 4000 to move.

In another embodiment, the sample tube 5000 which is taken liquid may be delivered to other recycle mechanism via the conveyor rail component 1201.

Referring to FIG. 10, the various rails may be configured with an operating mechanism, so as to accuracy locating the sample rack 4000, so as to be convenient to aspirate liquid. Exemplarily, the conveyor rail component 1201 may include a rail mounting frame 123, a second sensor 124 and a third sensor 125. The second sensor 124 and the third sensor 125 may be configured to detect photoelectricity for the sample rack 4000, so as to identify a position and a state of the sample rack 4000. Furthermore, the second sensor 124 is disposed on the head end, and the third sensor 125 is disposed on a positioning position of the sample rack 4000.

The various rails may include a belt-conveying line disposed on the rail mounting frame 123. Each of the various rails may includes a belt-driving mechanism 126 for driving the belt-conveying line, respectively. The routine inlet rail 8 may include a temporary retention component 127 and a routine-sample positioning component 128. The temporary retention component 127 may include a buffer lever and a buffer drive member. The buffer drive member is configured to control the buffer lever to stop or allow the sample rack 4000 to pass. The routine-sample positioning component 128 may include a routine-sample positioning lever and a routine-sample positioning drive member. The routine-sample positioning drive member is configured to drive the routine-sample positioning lever to stop or allow the sample rack 4000 to pass.

The pipetting component 1202 is in fit with the routine-sample positioning component 128 to realize precise positioning and sample injection, for example, sample injection may be in a liquid aspirating manner. The temporary retention component 127 is configured to temporarily retain and position the subsequent sample rack 4000. After the sample tube 5000 of the sample rack 4000 at the routine-sample positioning component 128 completing the sample injection, the belt-driving mechanism 126 is in operation to not only deliver out the previous sample rack 4000, but also deliver in the next sample rack 4000. The temporary retention component 127 can avoid interference between adjacent sample racks 4000, and can quickly be couple to the next sample rack 4000 after the previous sample rack 4000 completes sample injection, which can reduce a waiting time and speed up a process.

The priority inlet rail 9 may include a priority-sample positioning component 129. The priority-sample positioning component 129 may include a priority-sample positioning lever and a priority-sample positioning drive member for driving the priority-sample positioning lever to block or allow the sample rack 4000 to deliver. The sample rack 4000 of the priority inlet rail 9 can directly reach a positioning position of the priority inlet rail 9. The pipetting component 1202 can accurately position and inject sample. According to the information identification of the control component 1103, it can be determined which sample rack 4000 or which sample tube 5000 is inserted to perform a priority sample injection.

Referring to FIGS. 7 and 11 to 14, exemplarily, the pipetting component 1202 may include a three-axis motion mechanism 18 and a pipetting mechanism 19. Supporting legs 110 of the three-axis motion mechanism 18 are disposed on both sides of the reaction disk component 1203 along the Y-axis direction. The three-axis motion mechanism 18 may be fixed to the sample preparation frame 1212 via two supporting legs 110. The sample preparation device 1200 has an integral structure, and the three-axis motion mechanism 18 has a compact footprint in the sample preparation device 1200. The pipetting mechanism 19 is fixed at an end of the three-axis motion mechanism 18.

Figure 11:
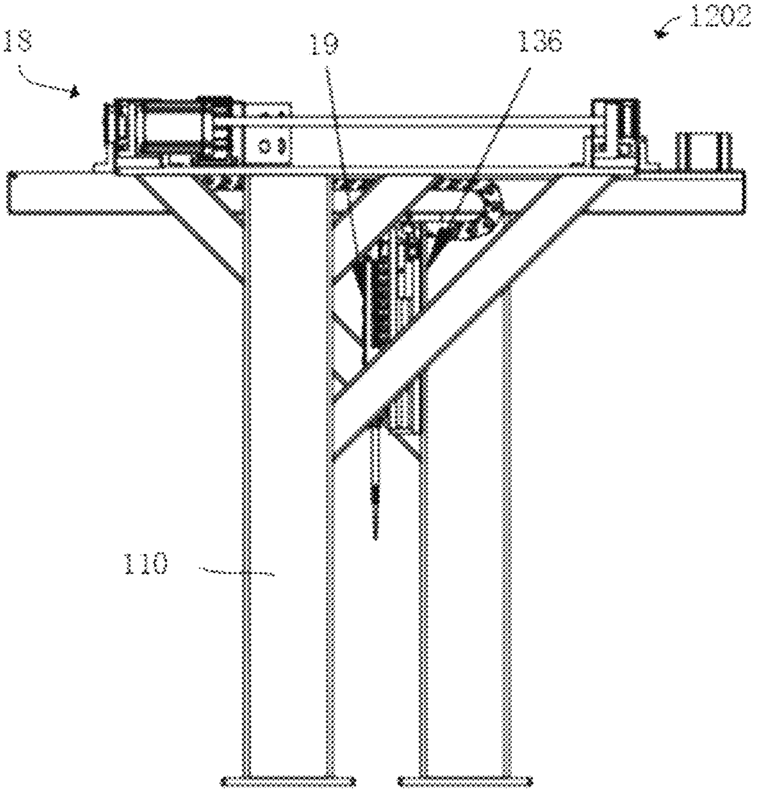
FIG. 11 is a schematic side view of a pipetting component of a mass spectrometry sample preparation apparatus in some embodiments.
Figure 12:
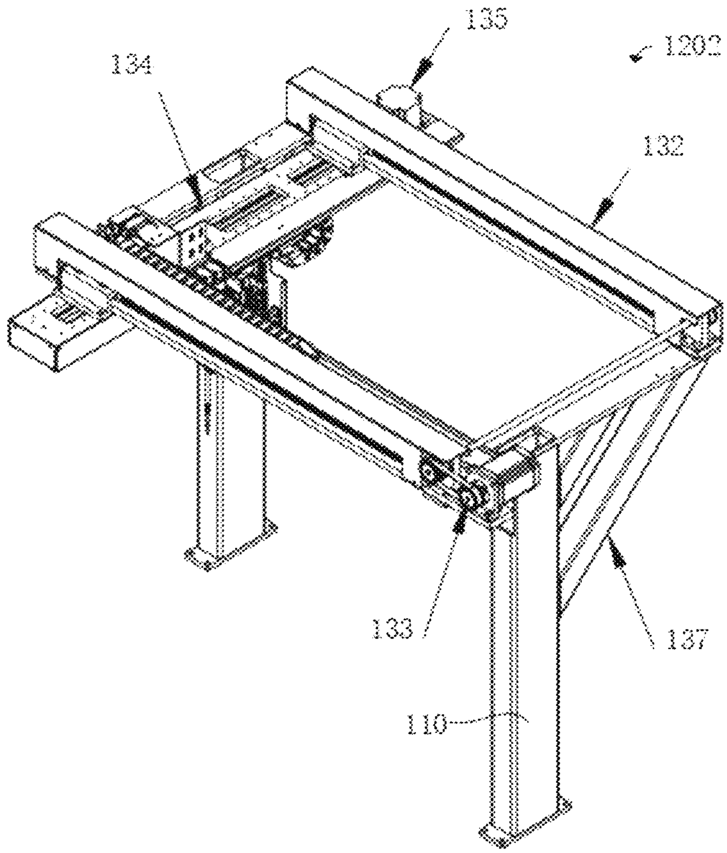
FIG. 12 is a schematic axonometric view of a pipetting component of a mass spectrometry sample preparation apparatus in some embodiments.

Referring to FIGS. 11 and 12, the three-axis motion mechanism 18 may include a Y-axis transmission mechanism 132, an X-axis transmission mechanism 134, and a Z-axis lift mechanism 136. The Y-axis transmission mechanism 132 may be disposed on the supporting legs 110 and may be supported by an oblique support 137. The X-axis transmission mechanism 134 is driven by the Y-axis drive mechanism Y-axis drive mechanism 133 to move along the Y-axis direction. The X-axis transmission mechanism 134 is driven by the X-axis drive mechanism 135 to drive the Z-axis lift mechanism 136 to move along the X-axis direction. The Z-axis lift mechanism 136 is configured to drive the pipetting mechanism 19 to lift and lower in the Z-axis direction.

Figure 13:
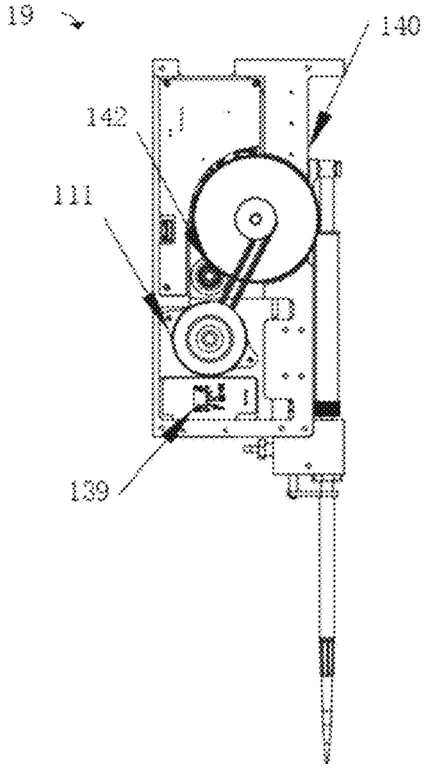
FIG. 13 is a schematic front view of a pipetting mechanism of a mass spectrometry sample preparation apparatus in some embodiments.
Figure 14:
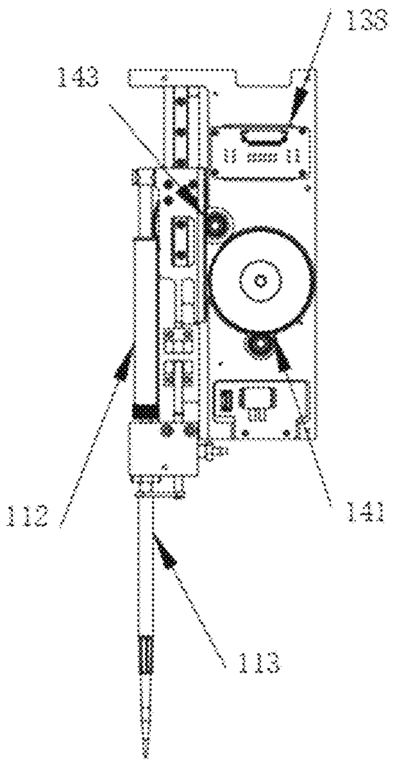
FIG. 14 is a schematic rear view of a pipetting mechanism of a mass spectrometry sample preparation apparatus in some embodiments.

Referring to FIGS. 13 and 14, the pipetting mechanism 19 includes a drive member 111, a pipette 112, and a tip ejector 113. The drive member 111 is configured to drive the pipette 112 to absorb and discharge liquid. The tip ejector 113 is configured to remove a pipette tip installed at the pipette 112. The pipette tip may be referred to as a TIP tip.

The pipetting mechanism 19 may further include a pipetting mounting base 140 and a transmission motor disposed on the pipetting mounting base 140. The drive member 111 may be a drive motor. The drive member 111 drives the pipette 112 to act via a first-stage reduction gear mechanism 141, a second-stage reduction gear mechanism 142, and a third-stage reduction gear mechanism 143, facilitating realizing a high-precision pipetting function. The pipette 112 may be a precision plunger pipette, which can realize a high-precision pipetting function under the control of the drive member 111, so as to ensure a pipetting accuracy and consistency. The pipetting mechanism 19 may be configured with a pipetting control board 138 to control actions.

The pipetting mechanism 19 may further include a detection control board 139. The detection control board 139 may be a pressure-sensing control board configured to perform multiple functions including liquid aspiration, automated liquid-level detection during aspiration, liquid-level tracking, and clog detection during aspiration. The pipetting component 1202 can enable the pipetting mechanism 19 to move to any position within a predefined range for the pipette tip pickup and ejection. Referring to FIG. 7, the sample preparation device 1200 further includes a second waste box 43. The discarded pipette tip can be collected into the second waste box 43. The pipetting component 1202 realizes actions of liquid extracting and liquid injection at different positions.

Figure 15:
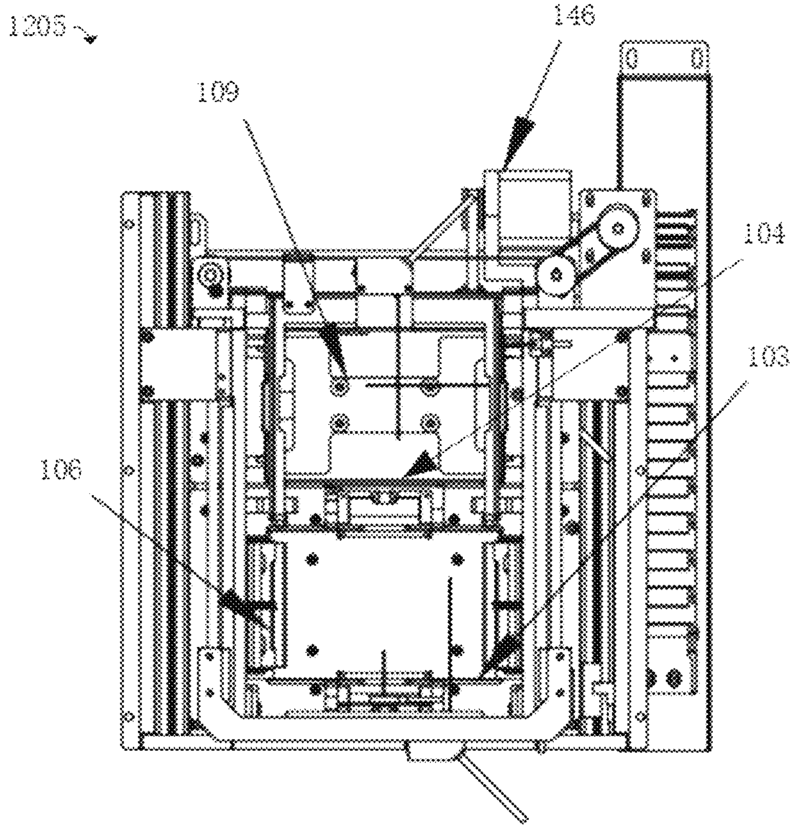
FIG. 15 is a schematic top view of a loading mechanism of a mass spectrometry sample preparation apparatus in some embodiments.
Figure 16:
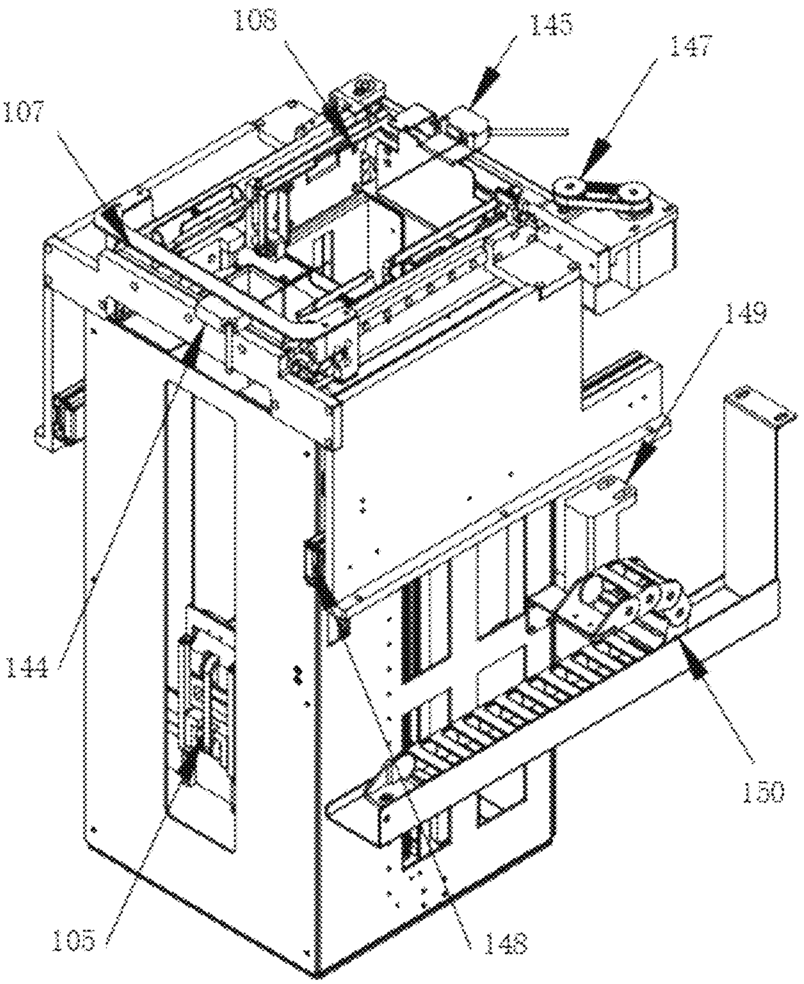
FIG. 16 is a schematic axonometric view of a loading mechanism of a mass spectrometry sample preparation apparatus in some embodiments.

Referring to FIG. 7, in some embodiments, the sample preparation device 1200 further includes a loading mechanism 1205 for providing the pipetting mechanism 19 with a new pipette tip. The loading mechanism 1205 and the conveyor rail component 1201 may be located on two sides of the pipetting mechanism 19, respectively. Referring to FIGS. 15 and 16, the loading mechanism 1205 may include a feeding chamber 103, a waste chamber 104, a vertical pushing mechanism 105, a guide support member 106, a horizontal pushing mechanism 107, a centering clamping mechanism 108, and a receiving member 109.

The feeding chamber 103 and the waste chamber 104 are disposed side by side. The waste chamber 104 may be positioned more adjacent to the conveyor rail component 1201. The operator places a box of pipette tips in the feeding chamber 103 in a stacked manner. The loading mechanism 1205 is configured to realize automatic loading and automatic unloading of the pipette tips. The loading mechanism 1205 can be in fit with the pipetting mechanism 19 to realize automatic installation and removal of the pipette tips.

The vertical pushing mechanism 105 is disposed in the feeding chamber 103. The vertical pushing mechanism 105 may be a vertical pushing clamping plate mechanism and may be provided with a scanning photoelectric switch. The scanning photoelectric switch can identify whether a supporting rack which is loaded with a pipette tip is disposed on the vertical pushing mechanism 105, and identify the number of layers of the supporting rack which is loaded with the pipette tip. The vertical pushing mechanism 105 can push upward one layer of the supporting rack which is loaded with the pipette tip each time, and can return in a certain distance.

The guide support member 106 is disposed above the vertical pushing mechanism 105 and is configured to be pushed upward by the vertical pushing mechanism 105. The guide support member 106 may be a turning plate or a wedge block, which can support the layer of the supporting rack which is loaded with the pipette tip. The horizontal pushing mechanism 107 is disposed above the guide support member 106 for pushing the layer of the supporting rack which is loaded with the pipette tip on the guide receiving member 106 to the centering clamping mechanism 108. Referring to FIG. 16, a fourth sensor 144 may be provided as a photoelectric sensor for detecting whether the tip-supporting rack has been elevated to a predetermined position, whereupon horizontal pushing is initiated. A fifth sensor 145 may be provided as a photoelectric sensor for detecting horizontal positioning. Upon detection that the supporting rack loaded with a pipette tip has reached the horizontal position, the centering clamping mechanism 108 clamps and positions the supporting rack loaded with a pipette tip, ensuring accurate new tip mounting by the pipetting mechanism 19.

In order to make a structure compact, the centering clamping mechanism 108 may be disposed on the waste chamber 104. After the pipette tip in the centering clamping mechanism 108 being used up, the centering clamping mechanism 108 is loosened to eject the supporting rack loaded with the pipette tip. The receiving member 109 is disposed in the waste chamber 104 and can receive the ejected supporting frame. Exemplarily, the horizontal pushing mechanism 107 may be driven by the horizontal-pushing drive mechanism 146 to push and return horizontally. The centering clamping mechanism 108 can be driven by the clamping drive mechanism 147 to clamp and prevent loosening.

The feeding chamber 103 and the waste chamber 104 may be fixed together as an entire chamber. The loading mechanism 1205 may include a three-section push rail 148 and a magnet component 149. The chamber can be slidably connected to the sample preparation frame 1212 along the X-axis direction via the three-section push rail 148, facilitating placing a new pipette tip or removing the supporting frame. The magnet component 149 may include a high-strength electromagnet. When the chamber is pushed in, the chamber is automatically magnetically locked, and when the chamber is required to be pulled out, the chamber can be release magnetic lock via a button. Movement of the chamber may be electrically controlled. The loading mechanism 1205 may include a cable drag chain 150, so as to ensure electrical control of the mechanisms of the loading mechanism 1205 by the second control element 1213. The loading mechanism 1205 can realize functions such as automated identification, automated replacement, material shortage identification alarm, waste identification alarm and so on.

Figure 17:
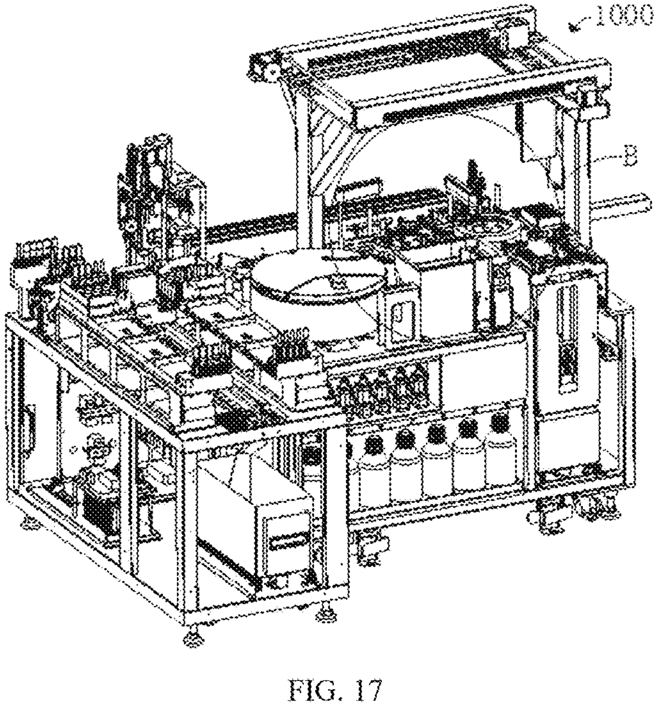
FIG. 17 is a schematic diagram of a mass spectrometry sample preparation apparatus in some embodiments.
Figure 18:
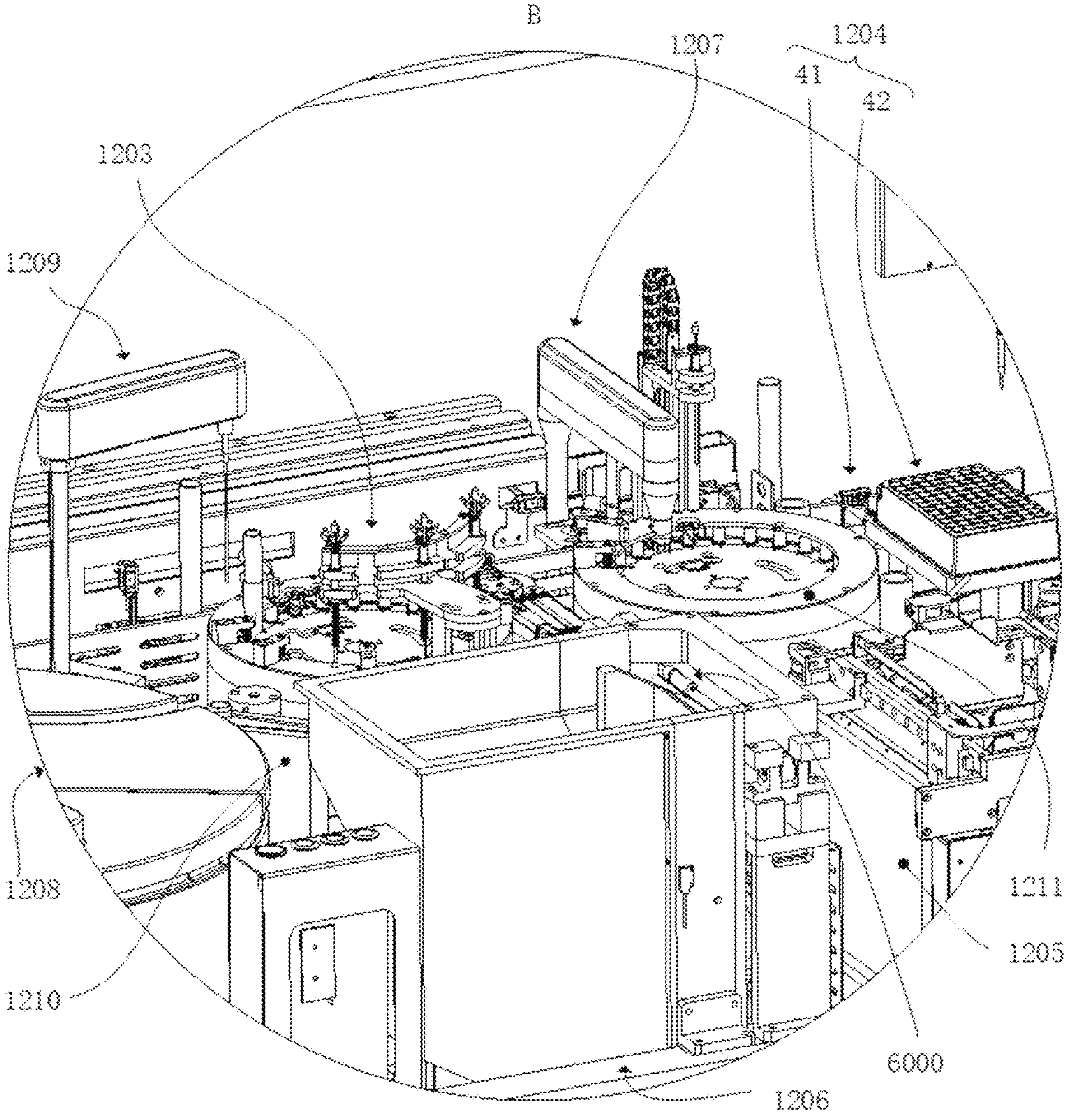
FIG. 18 is an enlarged view of portion B in FIG. 17.
Figure 19:
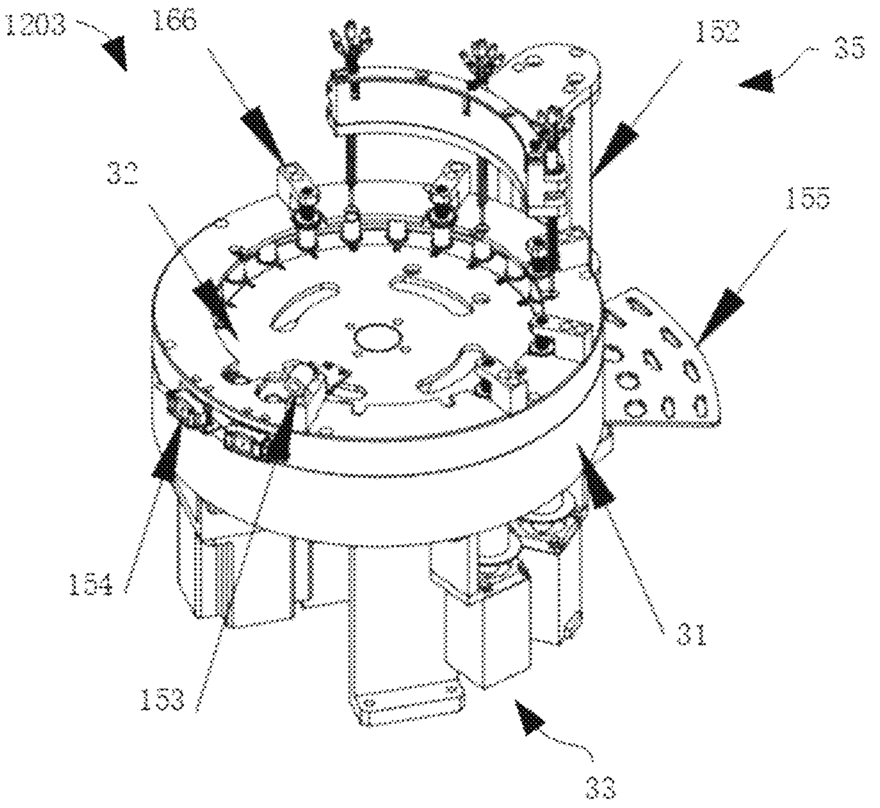
FIG. 19 is a schematic diagram of a reaction disk component of a mass spectrometry sample preparation apparatus in some embodiments.
Figure 20:
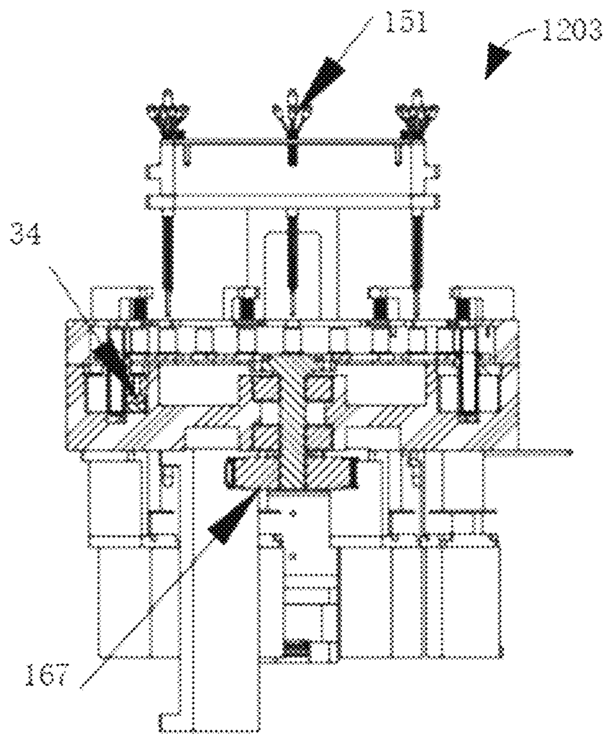
FIG. 20 is a schematic diagram of a reaction disk component of a mass spectrometry sample preparation apparatus in some embodiments.

Referring to FIG. 7, FIG. 17 and FIG. 18, the reaction disk component 1203 may be substantially located at a core position of the sample preparation device 1200, and other mechanisms are disposed around it. The reaction disk component is configured to perform magnetic bead-based pretreatment on a sample aspirated liquid into a reaction cup. Referring to FIGS. 19 and 20, in some embodiments, the reaction disk component 1203 includes a first outer disk 31, a first inner disk 32, a first mixing member 33, a first magnetic separation member 34, and a rinse member 35.

The first outer disk 31 and the first inner disk 32 are configured to restrict the corresponding reaction cup 6000 and adjust a position of the reaction cup 6000. The first outer disk 31 may be configured as an integral frame for integrating and installing other functional mechanisms. The first inner disk 32 can rotate around an axis of the first inner disk 32 and can be controlled by the first inner-disk drive mechanism 167, such that the reaction cup 6000 restricted by a hole position of the first inner disk 32 may stop at a reset circumferential position to realize scheduling of the reaction cup 6000. In some embodiments, the reaction disk component may have a cup handling position, a liquid injection position, a water injection position, a mixing position and so on.

The mixing position may be provided after the cup handling position, the liquid injection position, the water injection level, or the mixing position. The first mixing member 33 is configured to mix substances in the reaction cup 6000. The substances in the reaction cup 6000, which is located at the mixing position, may include samples, magnetic beads, various reagents and so on. The first mixing member 33 may include a first cup-pressing mechanism 166 for preventing the reaction cup 6000 from separating from the hole position of the first inner disk 32 during mixing.

The first magnetic separation member 34 is configured to attract magnetic beads in the reaction cup 6000. When the liquid is extracted after the reaction is completed, the attracted magnetic beads further retain the substances attracted by the magnetic beads, facilitating extracting the liquid. Sample preparation methods of different substances are different. In some embodiments, the remaining substances may be effective substances.

The rinse member 35 is configured to wash the magnetic beads and for extracting the waste liquid. The rinse member 35 may include a rinse liquid needle 151, such as six rinse liquid needles 151 and a waste liquid needle. The ratio of the reaction reagents can be adjusted according to requirements of elution. The rinse member 35 may include a rinse and lift mechanism 152, which may synchronously drive three groups of rinse liquid needles 151 to move vertically. The rinse member 35 may include a rinse water needle 153. The rinse water needle 153 can be configured for dilution.

The reaction disk component 1203 is mainly configured to complete functions such as rinse purification, uniform mixing, magnetic absorption, and elution and extraction of a sample. The reaction disk component 1203 may further include a sixth sensor 154. The six sensor 154 is provided as a photoelectric sensor configured to identify whether the reaction cup 6000 is located in the hole position of the first inner disk 32. In addition, the hole position of the first inner disk 32 may be the cup handling position. The rinse member 35 may be disposed in a position of the reaction disk component 1203 away from the conveyor rail component 1201.

Exemplarily, the sample preparation device 1200 may further include a cup handling component 1207 capable of handling the reaction cup 6000 in the Z-axis direction. For example, the cup handling component 1207 can place an empty reaction cup 6000 on the reaction disk component 1203, take out the reaction cup 6000 from the reaction disk component 1203, and deliver the reaction cup 6000 from the reaction disk component on the sample delivery component 1204. The cup handling component 1207 may be located between the reaction disk component 1203 and the conveyor rail component 1201, so as to save a space and avoid interference with the pipetting component 1202. In other embodiments, the cup handling component 1207 may be lateral movement to handle the reaction cup 6000.

Referring to FIG. 7, FIG. 8, and FIG. 18, the sample delivery component 1204 is configured to provide a magnetic bead-based pretreatment sample to the mass spectrometer 2000. Exemplarily, the sample delivery component 1204 includes a reaction cup transfer member 41. The reaction cup transfer member 41 can deliver a single reaction cup 6000, and after the mass spectrometer 2000 acquires a pretreatment sample, the reaction cup transfer member 41 can retrieve the reaction cup 6000.

Exemplarily, the sample delivery component 1204 may include a 96-well plate loading position 42. The pipetting component 1202 is configured to inject liquid into the 96-well plate at the 96-well plate loading position 42. The 96-well plate containing the liquid may be subsequently detected and tested.

The sample delivery component 1204 may be disposed on a side of the reaction disk component 1203 away from the sample platform 1100. The mass spectrometer 2000 may be disposed with a side of the sample preparation device 1200 away from the sample platform 1100.

The sample preparation device 1200 mainly realizes processing functions such as dilution, purification, and extraction of the sample, and finally delivers a processed extract to a rear end detector for detection, such as for mass spectrometry analysis. In the magnetic bead-based sample preparation method, a target object is adsorbed by surface-modified magnetic particles, enabling rapid extraction via magnetic separation and significantly reducing the experimental time. The selective adsorption mechanism of the magnetic bead-based sample preparation method can effectively remove impurities such as proteins and salts, so as to obtain high-purity products, resulting in reducing interference of subsequent experiments. The magnetic bead-based sample preparation method is not required steps such as complex centrifugation or vacuum filtration, and only requires simple mixing, magnetic separation and washing operations to complete extraction.

In some embodiments of the present disclosure, the mass spectrometry sample preparation apparatus 1000 can realize different sample delivery modes by setting the routine loading position 1, the priority loading position 2, the routine loading position 8 and the priority loading position 9, and can process the sample tube 5000 placed at the priority loading position 2 in an inserted manner. By the control component 1103, automated coupling between the sample platform 1100 and the sample preparation device 1200 is realized, such that a pulsatile operation of the whole mass spectrometry sample preparation apparatus is effectively worked.

Referring to FIGS. 7 and 8, exemplarily, the sample preparation device 1200 may further include a reaction cup feeding component 1206, a reagent disk component 1208, a reagent needle component 1209, and a cleaning tank component 1210. The reaction cup feeding component 1206, the reagent disk component 1208, the reagent needle component 1209, and the cleaning tank component 1210 are mounted on the pretreatment frame 1212, which are generally surrounded the reaction disk component 1203.

Figure 21:
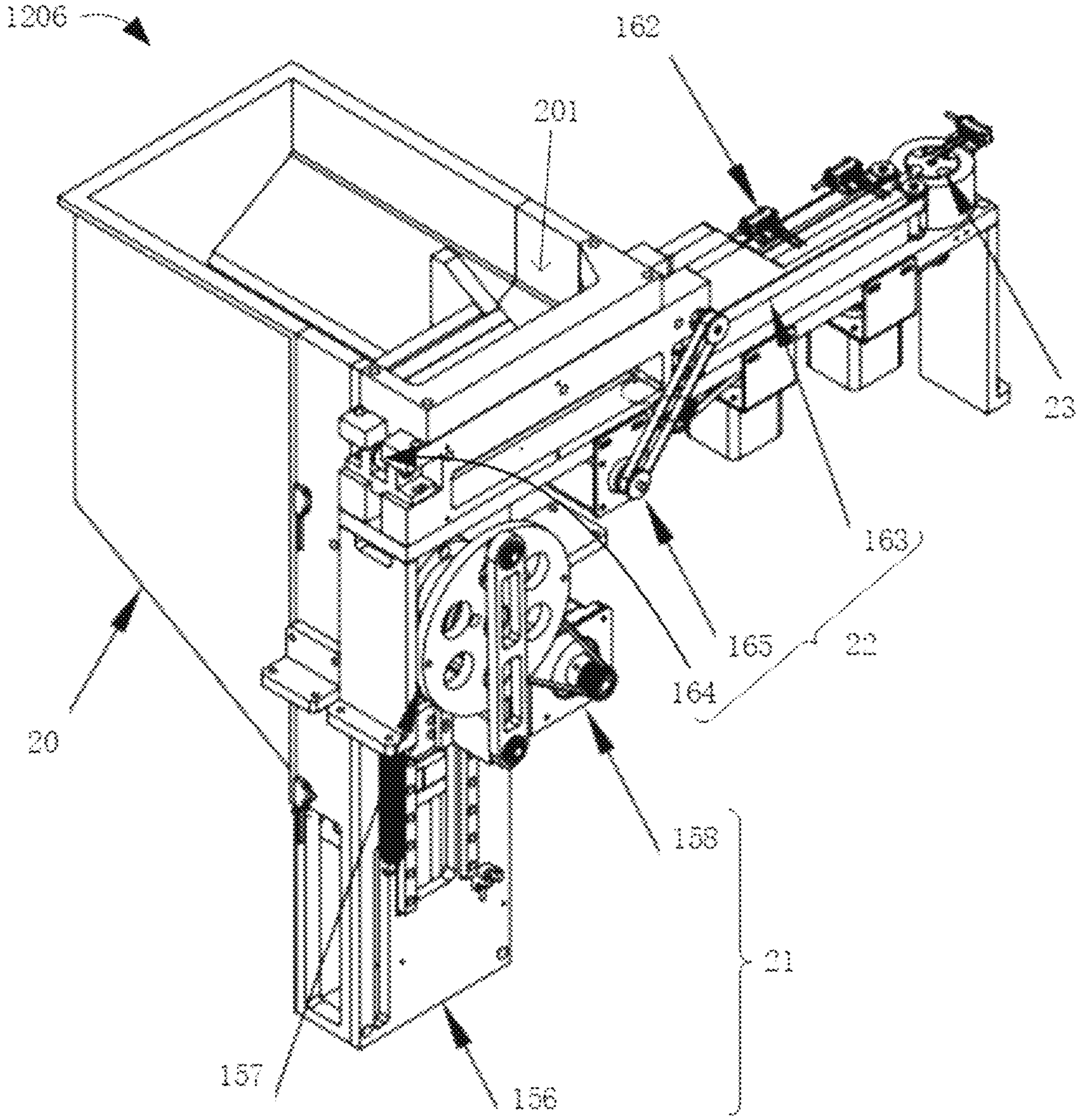
FIG. 21 is a schematic axonometric view of a reaction cup feeding component of a mass spectrometry sample preparation apparatus in some embodiments.
Figure 22:
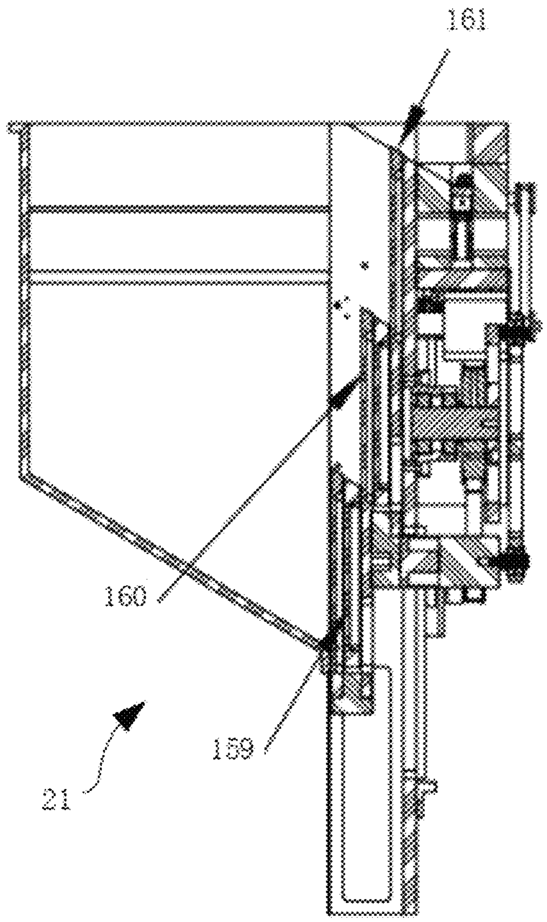
FIG. 22 is a schematic diagram of a reaction cup feeding component of a mass spectrometry sample preparation apparatus in some embodiments.

Referring to FIGS. 21 and 22, exemplarily, the reaction cup feeding component 1206 may include a feeder 20, a vertical feeding mechanism 21, a horizontal transfer mechanism 22, and a rotary cup dispensing mechanism 23. The reaction cup feeding component 1206 can adjust the bulk reaction cup 6000 to a posture suitable for accurate loading.

The feeder 20 contains the bulk reaction cups 6000. The bulk reaction cups 6000 may be empty reaction cups. The feeder 20 has a restricted selective outlet 201 to ensure that the output reaction cup 6000 has a straight posture, and the reaction cup 6000 in an inclined posture may fall back into the feeder 20.

The horizontal transfer mechanism 22 may include a retention-position adjustment mechanism 163 and a flat-belt conveyor member 164. The flat-belt conveyor member 164 may be located in the feeder 20 to ensure that the reaction cup 6000 is delivered to the restricted selective outlet 201. The retention-position adjustment mechanism 163 may be located outside the feeder 20 to adjust the reaction cup 6000 to a posture suitable for handling the reaction cup 6000.

The reaction cup 6000 can flow with gravity to the flat-belt conveyor member 164. Exemplarily, the restricted selective outlet 201 is disposed at a high position in the feeder 20. The vertical feeding mechanism 21 can push material upward from a lowest position of the feeder 20. The vertical feeding mechanism 21 is configured to feed a material from the feeder 20 to the flat-belt conveyor member 164 to indirectly push the reaction cup 6000 to the restricted selective outlet 201. The vertical feeding mechanism 21 facilitates adjusting a feeding posture and continuously feeding, so as to avoid the material blocking at the restricted selective outlet 201.

The vertical feeding mechanism 21 may include a vertical-feed mechanism mounting base 156, a crank-slider mechanism 157, a vertical-feed drive member 158, a first-stage feed pusher 159, a second-stage feed pusher 160, and a third-stage feed pusher 161.

The vertical-feed mechanism mounting base 156 is connected to the feeder 20. The vertical-feed mechanism mounting base can define a space for accommodating the reaction cup 6000 together with the feeder 20. Referring to FIG. 22, the first-stage feed pusher 159, the second-stage feed pusher 160, and the third-stage feed pusher 161 are fixedly arranged with progressively increasing heights. The first-stage feed pusher 159 may be located at a lowest position along the Z-axis direction. The vertical-feed mechanism mounting base 156 may include a first partition disposed between the first-stage feed pusher 159 and the second-stage feed pusher 160, and a second partition disposed between the second-stage feed pusher 160 and the third-stage feed pusher 161. The first-stage feed pusher 159 can feed to a top surface of the first partition. The second-stage feed pusher 160 can descend to a height where the first partition is located and to deliver cups to a top surface of the second partition. The third-stage feed pusher 161 can descend to a height where the second partition is located and to deliver cups to the flat-belt conveyor member 164. Referring to FIG. 22, the top surfaces of the first partition and the second first partition may be angled downward to the right. A thickness of the first partition or the second partition may be approximately the same as a diameter of the reaction cup 6000, and the reaction cup 6000 is continuously and sequentially loaded by reciprocating vertical movement of the first-stage feed pusher 159, the second-stage feed pusher 160 or the third-stage feed pusher 161.

A bottom surface of feeder 20 may be sloped. The vertical feeding mechanism 21 may include a through-beam photoelectric sensor. The through-beam photoelectric sensor is disposed at a lowest position of the feeder 20 for detecting the presence of a reaction cup 6000.

The vertical-feed drive member 158 can drive the first-stage feed pusher 159, the second-stage feed pusher 160 and the third-stage feed pusher 161 to vertically slide via the crank-slider mechanism 157. A crank may be designed as a ring for rotational trim. A spring may be provided to reset.

Exemplarily, the retention-position adjustment mechanism 163 may include two vertical synchronous belt mechanisms opposite to each other and disposed on two sides of the retention-position adjustment mechanism 163, respectively. A gap between the two synchronous belts can accommodate the reaction cup 6000 and support a cup rim of the reaction cup 6000. A height difference is defined between the retention-position adjustment mechanism 163 and the flat-belt conveyor member 164, such that the reaction cup 6000 discharged from the restricted selective outlet 201 falls, and an attitude of the reaction cup 6000 is adjusted due to gravity to realize an upward-facing opening of the reaction cup 6000. The two synchronous belts can rub against a cup wall of the reaction cup 6000 to deliver the reaction cup 6000 to the rotary cup dispensing mechanism 23. The retention-position adjustment mechanism 163 may stage a row of reaction cups 6000.

The horizontal transfer mechanism 22 may further include a seventh sensor 162. The seventh sensor 162 is disposed in a part of the retention-position adjustment mechanism 163 adjacent to the restricted selective outlet 201. When the seventh sensor 162 detects the absence of the reaction cup 6000, it means that the retention-position adjustment mechanism 163 lacks the reaction cup 6000, and in response to above situation, at least the flat-belt conveyor member 164 in the vertical feeding mechanism 21 and the horizontal transfer mechanism 22 can be in operation to replenish a new reaction cup 6000. When the seventh sensor 162 detects the presence of the reaction cup 6000, an action of loading the reaction cup may be stopped. The horizontal transfer mechanism 22 may further include an eighth sensor. The eighth sensor is located in a part of the retention-position adjustment mechanism 163 adjacent to the rotary cup dispensing mechanism 23. When the eighth sensor detects the absence of the reaction cup 6000, in response to it, the second control element 1213 may issue a cup missing alarm signal.

The horizontal transfer mechanism 22 may include a horizontal conveyor drive member 165 for driving the flat-belt conveyor member 164, and may further include other two drive members to drive the synchronous belt mechanism.

The rotary cup dispensing mechanism 23 is configured to separate a continuous array of reaction cups 6000 into separated multiple reaction cups. For example, the rotary cup dispensing mechanism 23 includes a turntable with four holes. A central angle of adjacent holes is defined as 90°. A plurality of separated reaction cups 6000 are convenient to grasp. A sensor may be provided to detect the presence of a reaction cup 6000 at a corresponding rotation position. When the absence of the reaction cup 6000 at the corresponding rotation position is detected, the turntable rotates, the buffered reaction cup 6000 is acquired by rotation, and when it is detected that the presence of the reaction cup 6000 at the corresponding rotation position, the turntable stops.

Referring to FIG. 18, the feeder 20 is disposed on a side of the reaction disk component 1203 away from the conveyor rail component 1201. The horizontal transfer mechanism 22 extends toward the conveyor rail component 1201. The retention-position adjustment mechanism 163 is located between the reaction disk component 1203 and a buffer disk component 1211.

Referring to FIGS. 7, 18, 23, and 24, the sample preparation device 1200 may further include the buffer disk component 1211. The buffer disk component 1211 may be in parallel with the reaction disk component 1203. The buffer disk component 1211 is located between the reaction disk component 1203 and the sample delivery component 1204. The buffer disk component 1211 can be handled by the cup handling component 1207, and can be aspirated liquid by the pipetting component 1202. The buffer disk component 1211 and the reaction disk component 1203 have compatible designs, allowing similar operations by common members. The treated liquid in the reaction disk component 1203 is transferred to the buffer disk component 1211, such that new reaction cup is replaced, the sample can be further processed, resulting in improving the production pulsation capability of the mass spectrometry sample preparation apparatus 1000. The mass spectrometry sample preparation apparatus 1000 has a compact structure, a time to execute each member is short, and the material flows fast and smooth. The buffer disk component 1211 may be configured to be capable of buffering a plurality of reaction cups 6000. The samples of a current process may be buffered by the buffer disk component 1211 regardless of whether a subsequent sample feeding process is suspended or a previous process sample is adjusted.

Figure 24:
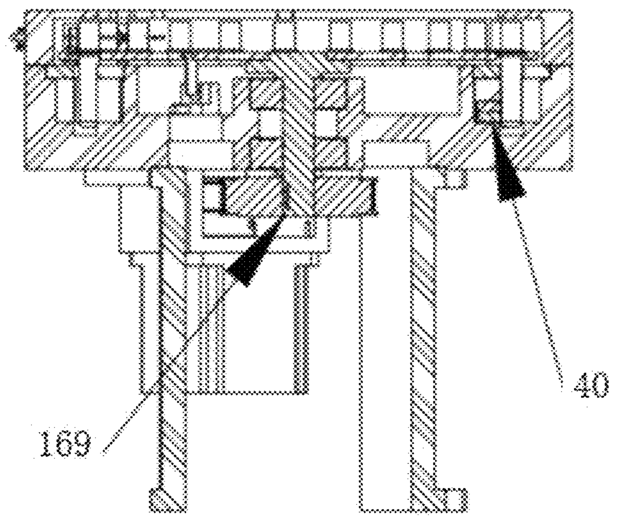
FIG. 24 is a schematic diagram of a buffer disk component of a mass spectrometry sample preparation apparatus in some embodiments.

The buffer disk component 1211 may include a second outer disk 36, a second inner disk 37, a dilution member 38, a second mixing member 39, and a second magnetic separation member 40. The second outer disk 36 may be configured as a frame for accommodating and mounting other functional mechanisms. The second outer disk 36 may be provided with a cup inlet and a cup outlet. Each of the cup inlet and the cup outlet may be provided with a sensor, such as a ninth sensor 170, so as to identify the presence of the reaction cup 6000 at the cup inlet or the cup outlet. The ninth sensor 170 may be a reflective sensor. Referring to FIG. 24, the second inner disk 37 can be driven by the second inner-disk drive mechanism 169 to rotate, so as to drive the reaction cup 6000 at each hole position to rotate relative to the second outer disk 36. The second outer plate 36 and the second inner disk 37 are configured to limit the corresponding reaction cup 6000 and adjust a position of the reaction cup 6000.

Figure 23:
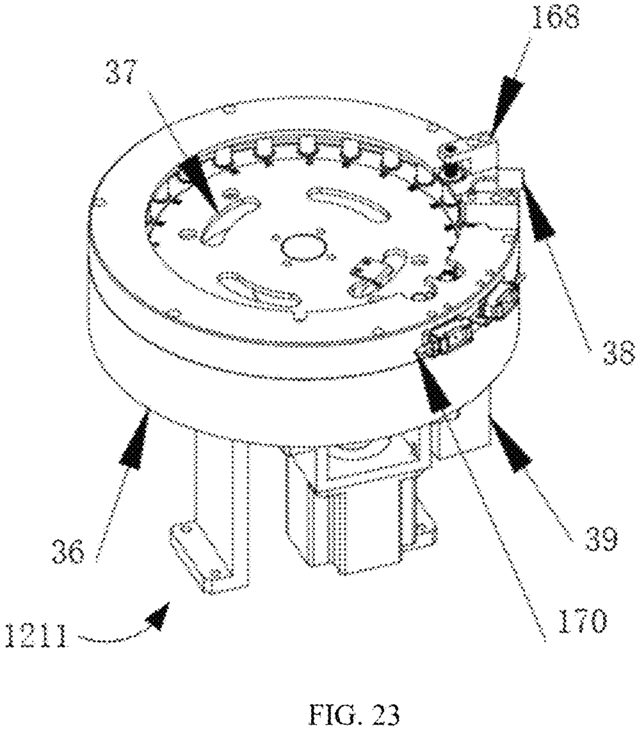
FIG. 23 is a schematic diagram of a buffer disk component of a mass spectrometry sample preparation apparatus in some embodiments.

The pipetting component 1202 is configured to transfer a sample, such as a transferable supernatant, from the reaction disk component 1203 to the buffer disk component 1211. A new reaction cup 6000 is added to the buffer disk component 1211 for receiving the eluted supernatant of the reaction disk component 1203, so as to greatly reduce an influence of magnetic bead residues on test results. Referring to FIG. 23, the dilution assembly 38 is configured to dilute substance of the reaction cup 6000, which may be diluted proportionally. The second mixing member 39 is configured to mix substances in the reaction cup 6000, and may include a second mixing member 168 pressing the reaction cup 6000 for mixing. The second magnetic separation member 40 is configured to attract the magnetic beads in the reaction cup 6000, so as to reduce an influence due to the residual magnetic beads and remove interference by collecting the magnetic beads.

The number of the reaction cups 6000 accommodated by the buffer disk component 1211 may be greater than or equal to that of reaction cups 6000 accommodated by the reaction disk component 1203. When a processing rhythm of subsequent process steps is slow or some processes are abnormal, it is ensured that the normal samples that have been injected can be processed and retained, thereby preventing sample waste.

The pipetting component 1202 may aspirate liquid to the 96-well plate. Exemplarily, the cup handling component 1207 of the sample preparation device 1200 is configured to deliver the reaction cup 6000 containing the sample from the buffer disk component 1211 to the reaction cup transfer member 41.

Referring to FIGS. 18, 7 and 4, reagent disk component 1208 is positioned between reaction disk component 1203 and sample platform 1100. Stations of the reagent disk component 1208 may be sequentially disposed in a counterclockwise rotation direction. The mass spectrometry sample preparation apparatus 1000 has a compact structure, such that a time of transferring the reagent is short.

Figure 25:
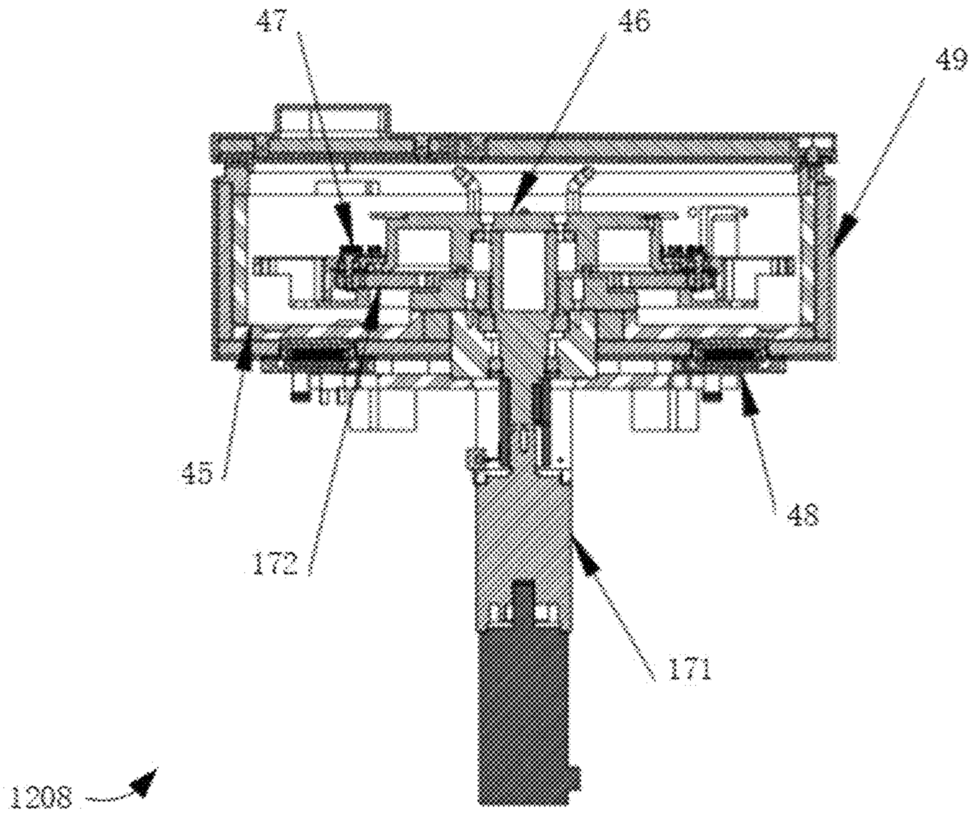
FIG. 25 is a schematic diagram of a reagent disk component of a mass spectrometry sample preparation apparatus in some embodiments.
Figure 26:
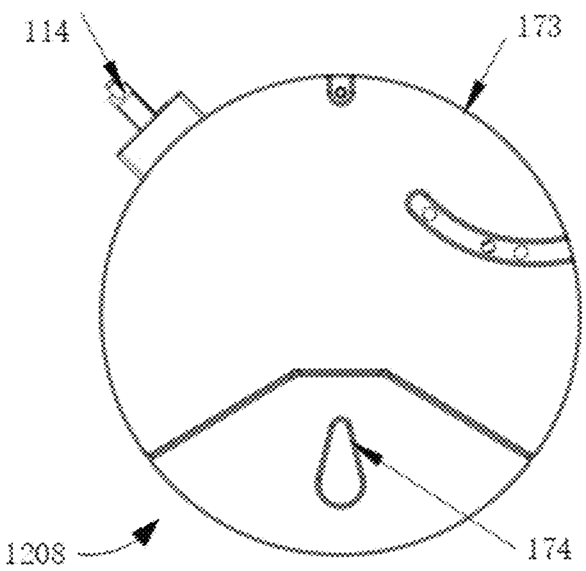
FIG. 26 is a schematic top view of a reagent disk component in some embodiments.

Referring to FIGS. 25 and 26, the reagent disk component 1208 may include a third outer disk 45, a third inner disk 46, a third mixing member 47, a cooling mechanism 48, and a thermal insulation layer 49. The third outer disk 45 may serve as a frame to support and connect other components. The thermal insulation layer 49 may surround the third outer disk 45, the third inner disk 46 and the third mixing member 47. The cooling mechanism 48 may be disposed at a lower portion of the third outer disk 45, and may be provided with four thermostatic cooling mechanisms. The four cooling mechanisms 48 may be in fit with the thermal insulation layer 49 to facilitate constant temperature control and ensuring an effect of reagents in the reagent kit.

The third inner disk 46 can be driven by the third inner-disk drive mechanism 171 to rotate, so as to schedule the reagent kit. The reagent disk component 1208 may further include a tooth-shaped mixing plate 172 installed in the third inner-disk drive mechanism 171. The tooth-shaped mixing plate 172 is configured to drive the third mixing member 47, so as to uniformly mix the magnetic bead-based solution, and precipitation can be prevented.

Referring to FIG. 26, an upper cap of the reagent disk component 1208 may include a fixing cover 173 and a window cover 174. The fixing cover is provided with a reagent-taking hole for the reagent needle component 1209 to take a reagent. Each portion of the upper cap may be provided with a thermal insulation portion of the thermal insulation layer 49. The reagent disk component 1208 can keep a constant temperature in a range of 2 degrees centigrade to 8 degrees centigrade.

Exemplarily, the reagent disk component 1208 includes a third scanning member 114. The third scanning member 114 may be mounted on a side surface of the third outer disk 45 for scanning the reagent kit in the reagent disk component 1208. The third scanning member 114, the first scanning member 101, and the second scanning member 102 may be in fit with each other to effectively control sample preparation steps of the sample.

Referring to FIG. 18, FIG. 8, and FIG. 7, the sample preparation frame 1212 may be provided with a button indicator component 122. The button indicator component may be configured to conveniently control a rotation of the third inner disk 46 to facilitate loading and unloading. An indicator light is convenient to display a state of the reagent disk component 1208 in real time. The sample preparation frame 1212 may be provided with a cooling circulation assembly 44. The cooling circulation assembly 48 may be configured to in fit with at least the cooling circulation assembly 48 to control a temperature of the reagent disk component 1208.

Referring to FIGS. 18 and 7, the reagent needle component 1209 is positioned between the reagent disk component 1208 and the reaction disk component 1203 and adjacent to the conveyor rail component 1201. The reagent needle component 1209 is configured to transfer a reagent from the reagent disk component 1208 to the reaction disk component 1203. The cleaning tank component 1210 is adjacent to the reaction cup feeding component 1206. The cleaning tank component 1210 is configured to clean the reagent needle 30 of the reagent needle component 1209.

Figure 27:
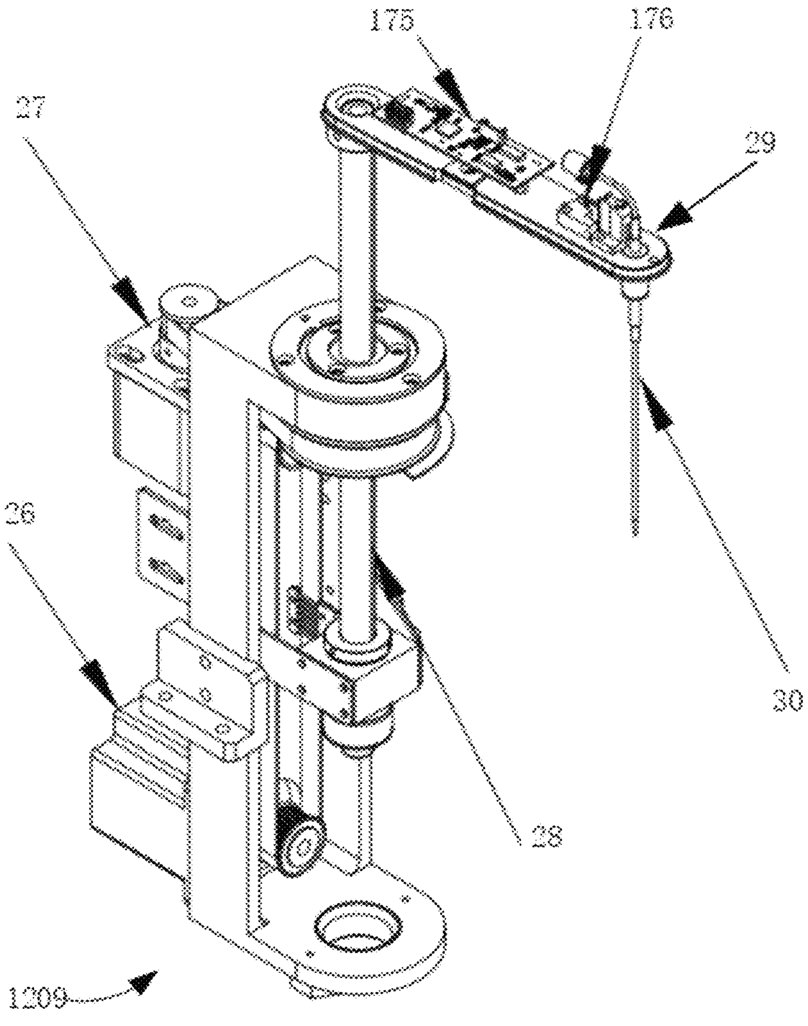
FIG. 27 is a schematic diagram of a reagent needle component in some embodiments.

Referring to FIG. 27, the reagent needle component 1209 includes a lift drive mechanism 26, a rotary drive mechanism 27, a spline shaft 28, a swing arm 29, and a reagent needle 30. The spline shaft 28 is slidably connected to the rotary drive mechanism 27. The spline shaft 28 may be a ball spline, such that the spline shaft 28 can be driven to rotate by the rotary drive mechanism 27. The lift drive mechanism 26 is rotatably connected to the spline shaft 28, but both the lift drive mechanism 26 and the spline shaft 28 are disposed axially along the spline shaft 28. The lift drive mechanism 26 is configured to drive the spline shaft 28 to slide. The swing arm 29 may extend along a radial direction of the spline shaft 28. Two ends of the swing arm 29 are fastened to the spline shaft 28 and the reagent needle 30, respectively. The reagent needle 30 may extend downward to facilitate liquid extraction. The lift drive mechanism 26 may be in fit with the rotary drive mechanism 27 to drive the reagent needle 30 to realize rotation, and can be lifted or lowed at different rotation positions. The reagent needle 30 is in communication with a pipet pump, and is controlled by the pipet pump to aspirate liquid and release liquid with high precision.

Exemplarily, the reagent needle component 1209 may further include a liquid-detection control board 175, so as to complete accurate liquid level detection and liquid level following functions. The reagent needle component may further include a tenth sensor 176. The tenth sensor 176 may be an anti-collision detection photoelectric sensor, so as to effectively identify collision abnormality for the reagent needle 30 and protect the reagent needle 30.

Figure 28:
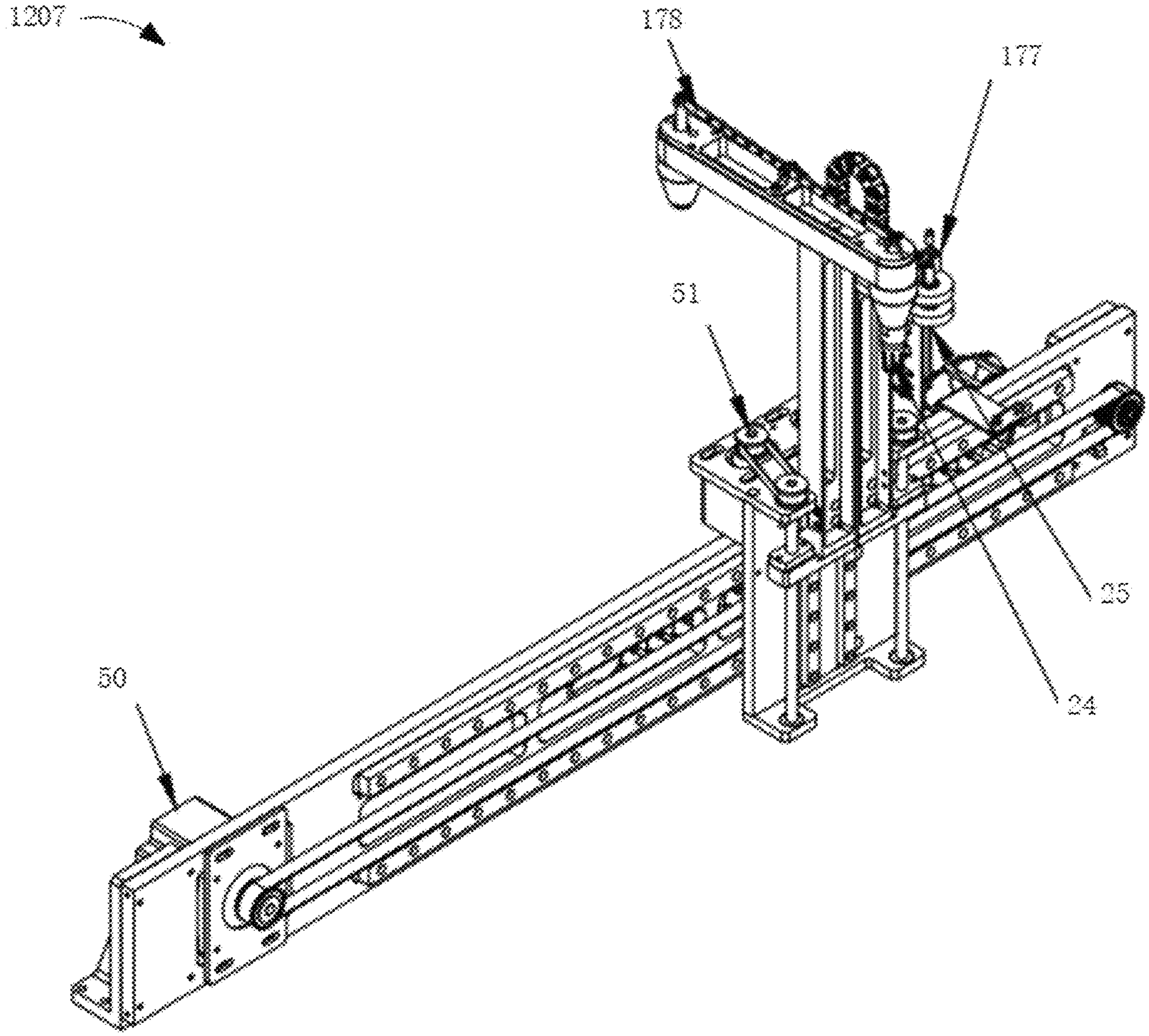
FIG. 28 is a schematic diagram of a cup handling component in some embodiments.

Referring to FIG. 28, the cup handling component 1207 includes a mechanical arm 24 and a waste liquid aspiration needle 25. The cup handling component 1207 may further include a horizontal-shift drive mechanism 50 and a vertical-handling drive mechanism 51. The horizontal-shift drive mechanism 50 may drive the vertical-handling drive mechanism 51 to shaft substantially in the Y-axis direction. The vertical-handling drive mechanism 51 may drive the mechanical arm 24 and the waste liquid aspiration needle 25 to lift and lower as a whole. The mechanical arm 24 and the waste liquid aspiration needle 25 may work respectively. Exemplarily, the waste liquid aspiration needle 25 can move in a vertical direction driven by the waste-liquid extraction vertical drive mechanism 177, such that the waste liquid in the reaction cup 6000 can be withdrawn. Referring to FIG. 18, the horizontal-shift drive mechanism 50 drives the mechanical arm 24 to a corresponding position of the buffer disk component 1211. The other end of the cup-discarding link 178 directly faces a preset fastening rod, so as to discard cup from the mechanical arm 24 after being triggered. The fastening rod may be preset at other positions, so as to meet a requirement of discarding the reaction cup 6000 at various preset positions.

Exemplarily, the mechanical arm 24 is configured to deliver the reaction cup 6000 from the reaction cup feeding component 1206 to the reaction disk component 1203, and configured to remove the waste reaction cup 6000 from the reaction cup transfer member 41. Furthermore, the mechanical arm 24 is further configured to deliver the reaction cup 6000 from the reaction cup feeding component 1206 to the buffer disk component 1211, and to deliver the reaction cup 6000 from the buffer disk component 1211 to the reaction cup transfer member 41. The waste liquid aspiration needle 25 is configured to aspirate waste liquid from the reaction cup 6000 discarded in the reaction cup transfer member 41. The waste liquid aspiration needle 25 may be further configured to aspirate waste liquid from the reaction cup 6000 of the reaction disk component 1203.

The cup handling component 1207 is disposed between the reaction disk component 1203 and the conveyor rail component 1201, and may be shorter than a normal moving route of the pipetting component 1202. The cup handling component 1207 is mainly configured to implement functions such as grabbing, transferring, and removing the reaction cup 6000. The waste reaction cup 6000 may be collected into the second waste box 43.

Referring to FIG. 7 and FIG. 8, exemplarily, the sample preparation frame 1212 of the sample preparation device 1200 may be further provided with a waste liquid pump 118, a solvent bottle 119, a fluid line pump-valve component 120 and a fluid line conversion component 121. The waste liquid pump 118 may be in communication with the waste liquid aspiration needle 25. The solvent bottle 119 is configured to accommodate reagents and solvents of an extraction reaction, and may be in communication with the rinse member 35. Exemplarily, the reaction disk component 1203 includes a wire transition plate 155, which can mount, fold, and classify liquid pipeline and electric wires.

The fluid line pump-valve component 120 is configured for a liquid path system and integrated with members such as a pump, a valve, a pipeline and so on, so as to implement liquid supply and liquid injection in a liquid path of an entire system, and may be in communication with the pipetting mechanism 19. The fluid line conversion component 121 is configured for intermediate dispensing and distribution of purified water, integrating a liquid level switch for real-time monitoring of remaining liquid volume, and is in communication with the dilution member 38.

Figure 29:
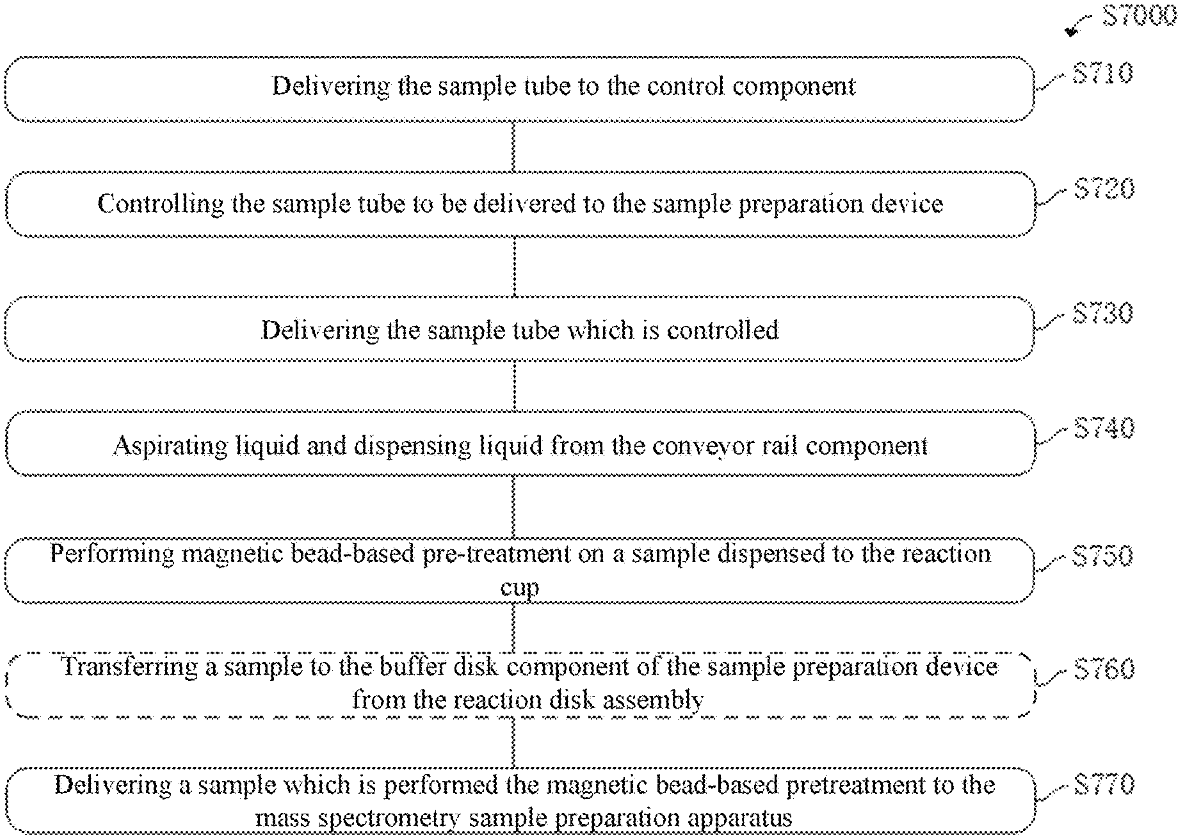
FIG. 29 is a schematic block flow diagram of a mass spectrometry sample preparation method in some embodiments.

Referring to FIG. 29, the present disclosure provides a mass spectrometry sample preparation method. In an exemplary embodiment, the mass spectrometry sample preparation method S7000 may be based on the above mass spectrometry sample preparation apparatus 1000 or mass spectrometry system.

The mass spectrometry sample preparation method S700 may include following steps.

Step S710 includes delivering the sample tube 5000 to the control component 1103.

Exemplarily, the step S710 includes: delivering the sample tube 5000 disposed at the routine loading position to the control component 1103; and in response to the priority loading position 2 being placed with the sample tube 5000, receiving the sample tube 5000 disposed at the priority loading position 2, in which the sample tube 5000 disposed at the priority loading position 2 is inserted ahead of the sample tube 5000 to be delivered at the routine loading position 1, and delivering the sample tube 5000 at the priority loading position 2 to the control component 1103. Exemplarily, the step of delivering the sample tube 5000 to the control component 1103 further includes: in response to the sample tube 5000 being disposed at the quality-control loading position 10 of the sample platform 1100, inserting the sample tube 5000 disposed at the quality-control loading position 10 of the sample platform 1100 before the sample tube 5000 to be delivered at the routine loading position 1, and delivering the sample tube 5000 to the control component 1103; and delivering the sample tube 5000 received from the production line 3000 at the inlet and outlet interface 11 of the sample platform 1100 to the control component 1103; and converting the sample tube 5000 which is disposed in reverse and inserted ahead of the control component 1103 into a forward arrangement by the diverter turntable 12 of the sample platform 1100. The mass spectrometry sample preparation method S7000 can process samples with high capacity, and support online loading and unloading. The maximum sample buffer volume reaches 320 of doses, realizing 8 hours to 12 hours of unattended operation time. Functions such as emergency first, intelligent insertion quality control and so on may be realized, so as to meet more and more complex usage scenario requirements. Furthermore, the sample channel coupled to the production line 3000 can be coupled to an automatic production line. The sample rack 4000 may be intelligently grasped to ensure reliable processing of the sample tube 5000.

Step S720 includes controlling the sample tube 5000 to be delivered to the sample preparation device 1200. Step S720 may include: identifying the acquired information of the sample tube 5000 by the control component 1103, clamping the acquired tube body of the sample tube 5000 by the clamping mechanism 6 of the control component 1103, and removing the acquired cap of the sample tube 5000 by the cap removal mechanism 7 of the control component 1103.

Exemplarily, in the Step S720, a step before removing the acquired cap of the sample tube 5000 by the cap removal mechanism 7 of the control component 1103 includes performing horizontal scanning on the acquired sample tube 5000 by the first scanning member 101 of the control component 1103; clamping the sample tube 5000 and controlling the sample tube 5000 to rotate for a circle by the cap removal mechanism 7 of the control component 1103, and performing scanning on the sample tube 5000 controlled to rotate by the second scanning member 102 of the control component 103. The mass spectrometry sample preparation method S7000 can realize fully automated treatment. A manual error is reduced and the efficiency is improved. By advantages of the magnetic bead-based method, the mass spectrometry sample preparation method S7000 adopts a production line operation mode to realize parallel processing of various processes, thus greatly increasing the throughput of pretreatment.

Step S730 includes delivering the controlled sample tube 5000. Step 730 of delivering the controlled sample tube may include delivering the sample tube 5000 which is controlled from the routine loading position by the routine inlet rail 8; delivering the sample tube 5000 which is controlled from the priority loading position 2 by the priority inlet rail 9. A priority sample can be inserted ahead of the routine samples and processed preferentially.

Step 740 includes aspirating liquid and dispensing liquid from the conveyor rail component 1201. The reaction cup 6000 may be dispensed liquid from the sample tube 5000.

Step 750 includes performing magnetic bead-based pretreatment on a sample aspirated into the reaction cup. The magnetic bead-based pretreatment includes using immunomagnetic beads or solid-phase magnetic beads. A pretreatment is performed by a magnetic bead-based method to extract. The magnetic bead-based method is compatible with solid-phase magnetic beads and immunomagnetic beads, which has good compatibility. The magnetic bead-based method can complete extraction in a short time, thereby significantly shortening an experimental cycle. Selective adsorption mechanism high-purity products can be acquired by a selective adsorption mechanism of the method, thereby reducing interference of subsequent experiments. The method does not require complex centrifugation or vacuum filtration steps, and the extraction can be completed only by simple mixing, magnetic separation and washing operations. The magnetic bead-based method is suitable for various sample types such as blood, tissue, saliva and environmental samples, and can adapt to different experimental requirements.

Alternatively, the reaction cup feeding component 1206 of the sample preparation device 1200 is configured to supply at least 1000 of reaction cups 6000. The reagent disk component 1208 of the sample preparation device 1200 is configured to supply at least 3000 doses of reagents, such that an unattended operation time of the mass spectrometry sample preparation method S7000 is greater than or equal to 8 hours. Exemplarily, when the mass spectrometry sample preparation apparatus is used in the production line 3000, the reaction cup 6000 and the reagents of the mass spectrometry sample preparation apparatus 1000 may be equipped with more, or periodically supplemented according to a treatment cycle.

Exemplarily, the mass spectrometry sample preparation method S7000 may include step S760: transferring a sample to the buffer disk component 1211 of the sample preparation device 1200 from the reaction disk component 1203. A dispensing liquid method of the mass spectrometry sample preparation method S7000 may be based on the mass spectrometry sample preparation apparatus 1000. For example, the cup handling component 1207 of the sample preparation device 1200 may be configured to deliver the reaction cup 6000 containing the sample from the buffer disk component 1211 to the reaction cup transfer member 41. The mass spectrometry sample preparation method S7000 is compatible with a multi-mode state. A front end of the sample preparation device 1200 adopts a reaction cup as a processing unit, and a minimum number of samples can be detected on a machine to instantly detect the samples, so as to greatly reduce a waste of reagents, and meanwhile, an rear end of the sample preparation device 1200 can have a function of delivering samples from a single reaction cup to a 96-well plate, such that the mass spectrometry sample preparation apparatus has extremely high compatibility.

The step 770 includes delivering a sample, which is performed the magnetic bead-based pretreatment, to the mass spectrometer 2000. A pre-treated supernatant may be provided by the reaction cup 6000.

In the present disclosure, the mass spectrometry sample preparation method is realized by a mass spectrometry sample preparation method, so as to achieve at least one effect such as automation, high throughput, and strong compatibility, and facilitating improving an overall performance of mass spectrometry analysis.

The various technical features of the above embodiments can be combined in any way. In order to make the description concise, not all possible combinations of the various technical features in the above embodiments have been described. However, as long as there is no contradiction in the combination of these technical features, they should be considered within the scope of the specification In the embodiments disclosed above, unless otherwise defined or limited, an execution order of the steps is not limited, for example, the steps may be executed in parallel, or may be executed in different orders. Sub-steps of each of the steps may be performed in an interleaved manner. The above various forms of processes may be used, and steps may also be reordered, added or deleted, as long as the desired results of the technical solutions provided by the present disclosure can be achieved, which is not limited herein.

The above embodiments only express several embodiments of the present disclosure, and their descriptions are more specific and detailed, but should not be understood as limiting the scope of the disclosure. It should be pointed out that for ordinary skill in the art, several modifications and improvements can be made without departing from the concept of the disclosure, which are within the scope of protection of the disclosure. Therefore, the scope of protection of the present disclosure should be based on the attached claims.

What is claimed is:

1. A mass spectrometry sample preparation apparatus for delivering a pretreated sample to a mass spectrometer, wherein the mass spectrometry sample preparation apparatus comprises a sample platform and a sample preparation device;

the sample platform has a loading area comprising a routine loading position and a priority loading position, the sample platform comprises:

a delivery component, the delivery component is configured to receive and convey the sample tube disposed at the routine loading position; and the delivery component is configured to receive and convey the sample tube disposed at the priority loading position when the sample tube is disposed at the priority loading position; and a control component, wherein the control component is configured to control the sample tube to be delivered to the sample preparation device; the control component comprises a grasping mechanism, an information identification mechanism, a clamping mechanism and a cap removal mechanism; the grasping mechanism is configured to acquire the sample tube from the delivery component; the information identification mechanism is configured to identify information of the acquired sample tube; the clamping mechanism is configured to clamp a tube body of the acquired sample tube; and the cap removal mechanism is configured to remove a cap of the acquired sample tube;

the sample preparation device comprises:

a conveyor rail component, wherein the conveyor rail component comprises a routine inlet rail and a priority inlet rail, and both the routine inlet rail and the priority inlet rail are coupled to the grasping mechanism and are configured to deliver the sample tube processed by the control component;

a pipetting component, wherein the pipetting component is configured to aspirate liquid from and dispense liquid to the conveyor rail component;

a reaction disk component, wherein the reaction disk component is configured to perform magnetic bead-based pretreatment on a sample dispensed liquid into a reaction cup; and a sample delivery component, wherein the sample delivery component is configured to deliver a sample, having undergone the magnetic bead-based pretreatment, to the mass spectrometer.

2. The mass spectrometry sample preparation apparatus of claim 1, wherein the delivery component comprises a transport member movable along a first direction, along a movement of the transport member, one end of the transport member is defined as the priority loading position, the control component is disposed on the other end of the transport member, the loading area comprises a plurality of routine loading positions, and the plurality of routine loading positions are disposed on both sides of the transport member;

the mass spectrometry sample preparation apparatus further comprises a quality-control loading position, and the quality-control loading position and the priority loading position are disposed on both sides of the transport member, respectively; and the sample platform further comprises an inlet and outlet interface, the inlet and outlet interface is spaced apart from the grasping mechanism, the inlet and outlet interface and the grasping mechanism are configured to be coupled to each other via the transport member, and the inlet and outlet interface is configured to be coupled to a production line.

3. The mass spectrometry sample preparation apparatus of claim 2, further comprising a sample rack, a sample basket and a diverter turntable, wherein the sample rack is configured to accommodate a column of sample tubes; the sample basket is configured to be positioned at the routine loading position and to accommodate a row of sample racks; a side of the sample basket towards the transport member is provided with an opening; the loading area is configured to simultaneously accommodating 320 of sample tubes disposed at the routine loading position;

the transport member is provided with a telescopic part configured to collect and deliver the sample rack along a second direction; and the diverter turntable is spaced apart from the control component and is configured to be coupled to the transport member, and the diverter turntable is configured to rotate the sample rack for direction change.

4. The mass spectrometry sample preparation apparatus of claim 1, wherein the control component further comprises a pushing mechanism and a lift mechanism, the pushing mechanism is configured to drive the grasping mechanism to move, so as to correspond to the routine inlet rail or the priority inlet rail, and the lift mechanism is configured to drive the clamping mechanism, such that the clamping mechanism has a low position or a high position; the cap removal mechanism is configured as the rotatable cap removal mechanism, and when the clamping mechanism is at the high position, the cap removal mechanism is configured to clamp a cap of the acquired sample tube; and the information identification mechanism comprises a first scanning member and a second scanning member, the first scanning member is configured to scan the acquired sample tube, and the second scanning member is configured to scan a controlled and rotated sample tube clamped by the cap removal mechanism.

5. The mass spectrometry sample preparation apparatus of claim 1, wherein the sample preparation device further comprises a loading mechanism, the loading mechanism comprises a feeding chamber, a waste chamber, a vertical pushing mechanism, a guide support member, a horizontal pushing mechanism, a centering clamping mechanism and a receiving member, the feeding chamber is disposed in parallel with the waste chamber, the vertical pushing mechanism is disposed in the feeding chamber, the guide support member is disposed above the vertical pushing mechanism and is configured to be pushed upward by the vertical pushing mechanism, the horizontal pushing mechanism is disposed on the guide support member, the centering clamping mechanism is disposed on the waste chamber and configured to clamp a supporting rack which is loaded with a pipette tip, and the receiving member is disposed in the waste chamber.

6. The mass spectrometry sample preparation apparatus of claim 1, wherein the pipetting component comprises a three-axis motion mechanism and a pipetting mechanism, and supporting legs of the three-axis motion mechanism are disposed on both sides of the conveyor rail component along an extending direction of the conveyor rail component; the pipetting mechanism is fixed at an end of the three-axis motion mechanism, the pipetting mechanism comprises a drive member, a pipette, and a tip ejector, the drive member is configured to drive the pipette to aspirate and dispense liquid, and the tip ejector is configured to eject a pipette tip installed at the pipette.

7. The mass spectrometry sample preparation apparatus of claim 1, wherein the sample delivery component comprises a reaction cup transfer member and a 96-well plate loading position;

the sample preparation device further comprises a reaction cup feeding component and a cup handling component;

the reaction cup feeding component comprises a feeder, a vertical feeding mechanism, a horizontal transfer mechanism and a rotary cup dispensing mechanism; the feeder is provided with a restricted selective outlet; the vertical feeding mechanism is configured to push a reaction cup from the feeder towards the restricted selective outlet; the horizontal transfer mechanism is configured to convey the reaction cup from the restricted selective outlet to the rotary cup dispensing mechanism;

the feeder is disposed on a side of the reaction disk component away from the conveyor rail component, and the horizontal transfer mechanism extends to the conveyor rail component;

the cup handling component comprises a mechanical arm and a waste liquid aspiration needle, the mechanical arm is configured to convey the reaction cup from the reaction cup feeding component to the reaction disk component, and is configured to remove a waste reaction cup from the reaction cup transfer member; the waste liquid aspiration needle is configured to suck waste liquid from the waste reaction cup, and the waste liquid aspiration needle is configured to suck waste liquid from the reaction cup of reaction disk component; the cup handling component is disposed between the reaction disk component and the conveyor rail component; and the 96-well plate loading position is disposed on a side of the reaction disk component away from the sample platform; and the pipetting component is configured to inject liquid into a 96-well plate at the 96-well plate loading position.

8. The mass spectrometry sample preparation apparatus of claim 7, wherein the sample preparation device further comprises a reagent disk component, a reagent needle component and a cleaning tank component;

the reagent disk component comprises a third scanning member configured for scanning a reagent kit in the reagent disk component; the reagent disk component is disposed between the reaction disk component and the sample platform;

the reagent needle component is configured to transfer a reagent from the reagent disk component to the reaction disk component; the reagent needle component comprises a lift drive mechanism, a rotary drive mechanism, a spline shaft, a swing arm and a reagent needle; the spline shaft is slidably connected to the rotary drive mechanism and is configured to be driven to rotate; the lift drive mechanism is configured to drive the spline shaft to slide, and both ends of the swing arm are fixed on the spline shaft and the reagent needle, respectively; the reagent needle component is disposed between the reaction disk component and the reagent disk component; and the cleaning tank component is configured to clean the reagent needle.

9. The mass spectrometry sample preparation apparatus of claim 1, wherein the reaction disk component comprises a first outer disk, a first inner disk, a first mixing member, a first magnetic separation member, and a rinse member; and the first outer disk and the first inner disk are configured to limit one corresponding reaction cup and adjust a position of the reaction cup, the first mixing member is configured to mix substances in the reaction cup, the first magnetic separation member is configured to attract magnetic beads in the reaction cup, and the rinse member is configured to rinse the magnetic beads and suction waste liquid.

10. The mass spectrometry sample preparation apparatus of claim 1, wherein the sample preparation device further comprises a buffer disk component, and the buffer disk component comprises a second outer disk, a second inner disk, a dilution member, a second mixing member and a second magnetic separation member;

the second outer disk and the second inner disk are configured to limit the corresponding reaction cup and adjust a position of the reaction cup; the dilution member is configured to dilute a substance in the reaction cup; the second mixing member is configured to mix the substance in the reaction cup; the second magnetic separation member is configured to attract magnetic beads in the reaction cup; and the pipetting component is further configured to transfer samples from the reaction disk component to the buffer disk component, and the number of the reaction cup accommodated by the buffer disk component is greater than or equal to that of the reaction cup accommodated by the reaction disk component.

11. A mass spectrometry sample preparation method, applied to the mass spectrometry sample preparation apparatus of claim 1, wherein the mass spectrometry sample preparation method comprises following steps:

delivering the sample tube to the control component, comprising: delivering the sample tube disposed at the routine loading position to the control component; and in response to the priority loading position being placed with the sample tube, receiving the sample tube disposed at the priority loading position, wherein the sample tube disposed at the priority loading position is inserted ahead of the sample tube to be delivered at the routine loading position, and delivering the sample tube at the priority loading position to the control component;

controlling the sample tube to be delivered to the sample preparation device, comprising:

identifying information of the acquired sample tube by the control component, clamping a tube body of the acquired sample tube by a clamping mechanism of the control component, and removing the cap of the acquired sample tube by the cap removal mechanism of the control component;

delivering the sample tube which is controlled, comprising: delivering the sample tube which is controlled from the routine loading position by the routine inlet rail; delivering the sample tube which is controlled from the priority loading position by the priority inlet rail;

aspirating liquid and dispensing liquid from the conveyor rail component;

performing magnetic bead-based pretreatment on a sample dispensed to the reaction cup; and delivering a sample which is performed the magnetic bead-based pretreatment to the mass spectrometry sample preparation apparatus.

12. The mass spectrometry sample preparation method of claim 11, wherein the magnetic bead-based pretreatment comprises using immunomagnetic beads or solid-phase magnetic beads.

13. The mass spectrometry sample preparation method of claim 11, further comprising transferring a sample to a buffer disk component of the sample preparation device from the reaction disk component; and delivering the reaction cup containing the sample from the buffer disk component to the reaction cup transfer member of the sample delivery component by the cup handling component of the sample preparation device, or dispensing liquid from the buffer disk component to the 96-well plate at the 96-well plate loading position of the sample delivery component.

14. The mass spectrometry sample preparation method of claim 11, wherein the step of delivering the sample tube to the control component further comprises: in response to the sample tube being disposed at the quality-control loading position of the sample platform, inserting the sample tube disposed at the quality-control loading position of the sample platform before the sample tube to be delivered at the routine loading position, and conveying the sample tube to the control component; and delivering the sample tube received from the production line at the inlet and outlet interface of the sample platform to the control component; and converting the sample tube which is disposed in reverse and inserted ahead of the control component into a forward arrangement by the diverter turntable of the sample platform;

the step of controlling the sample tube to be delivered to the sample preparation device further comprises: performing horizontal scanning on the acquired sample tube by a first scanning member of the control component; clamping the sample tube and controlling the sample tube to rotate for one circle by the cap removal mechanism of the control component, and performing scanning on the sample tube controlled to rotate by a second scanning member of the control component; and the reaction cup feeding component of the sample preparation device is configured to supply at least 1000 reaction cups, and the reagent disk component of the sample preparation device is configured to supply at least 3000 doses of reagents, such that an unattended operation time of the mass spectrometry sample preparation method is greater than or equal to 8 hours.

* * * * *